United States Patent
Linqvist et al.

(10) Patent No.: US 12,383,107 B2
(45) Date of Patent: Aug. 12, 2025

(54) DUST EXTRACTOR

(71) Applicant: Mirka Ltd, Jepua (FI)

(72) Inventors: Tommy Linqvist, Nykarleby (FI); Jan-Anders Westerlund, Jakobstad (FI); Mikael Häggblom, Vasa (FI); Alexander Hede, Vörå (FI)

(73) Assignee: Mirka Ltd, Jepua (FI)

( * ) Notice: Subject to any disclaimer, the term of this patent is extended or adjusted under 35 U.S.C. 154(b) by 0 days.

(21) Appl. No.: 18/712,305

(22) PCT Filed: Nov. 8, 2022

(86) PCT No.: PCT/FI2022/050733
§ 371 (c)(1),
(2) Date: May 22, 2024

(87) PCT Pub. No.: WO2023/094725
PCT Pub. Date: Jun. 1, 2023

(65) Prior Publication Data
US 2024/0415353 A1  Dec. 19, 2024

(30) Foreign Application Priority Data
Nov. 23, 2021  (FI) ..................... 20216196

(51) Int. Cl.
*A47L 9/28* (2006.01)
*A47L 7/00* (2006.01)
*B23Q 11/00* (2006.01)
*B24B 55/06* (2006.01)

(52) U.S. Cl.
CPC ........... *A47L 9/2821* (2013.01); *A47L 7/0095* (2013.01); *A47L 9/2842* (2013.01); *A47L 9/2857* (2013.01); *A47L 9/2868* (2013.01); *A47L 9/2889* (2013.01); *B23Q 11/0046* (2013.01); *B24B 55/06* (2013.01)

(58) Field of Classification Search
CPC .... A47L 9/2821; A47L 7/0095; A47L 9/2842; A47L 9/2857
See application file for complete search history.

(56) References Cited

U.S. PATENT DOCUMENTS

| | | | |
|---|---|---|---|
| 5,243,732 A * | 9/1993 | Koharagi | A47L 9/2857 706/900 |
| 2013/0019901 A1* | 1/2013 | Gerhards | A47L 9/2821 134/21 |
| 2019/0110655 A1* | 4/2019 | Van Der Kooi | A47L 9/2821 |
| 2022/0400923 A1* | 12/2022 | Eriksson | A47L 9/2842 |

FOREIGN PATENT DOCUMENTS

| | | | |
|---|---|---|---|
| EP | 0563788 A1 | * | 10/1993 |
| EP | 0564817 A1 | * | 10/1993 |
| JP | 2013-22359 A | | 2/2013 |
| JP | 2013022359 A | * | 2/2013 |
| WO | 2021096409 A1 | | 5/2021 |

OTHER PUBLICATIONS

International Search Report and Written Opinion in PCT/FI2022/050733, mailed Feb. 10, 2023, 12 pages.

* cited by examiner

*Primary Examiner* — Marc Carlson
(74) *Attorney, Agent, or Firm* — ArentFox Schiff LLP

(57) ABSTRACT

A dust extractor device that includes: a fan for causing an air flow, a motor to rotate the fan, a dust separator to separate dust particles from the air flow, a flow measuring unit for measuring air flow rate of the air flow, and a control unit configured to adjust electric power of the motor based on the measured air flow rate.

14 Claims, 12 Drawing Sheets

Comparative example

DUST EXTRACTOR

CROSS-REFERENCE TO RELATED APPLICATIONS

This application is a National Phase of PCT/FI2022/050733, filed on Nov. 8, 2022, which claims priority to Finnish Patent Application No. 20216196, filed on Nov. 23, 2021, the disclosures of each of which are hereby incorporated by reference in their entireties.

FIELD

The present invention relates to a dust extractor.

BACKGROUND

A dust extractor may be used for removing dust particles e.g. at a workshop or at a construction site. The dust extractor causes suction to remove dust particles. The dust extractor may draw an air flow via a hose, so as to remove dust particles, which are carried by the air flow. The dust extractor may comprise a filter for collecting the dust particles from the air flow. The filter and/or the hose may sometimes become blocked so that a sufficient air flow rate cannot be maintained.

A dust extractor approved for extracting hazardous dust may comprise a flow sensor for monitoring air flow velocity in the suction hose. The dust extractor may provide a buzzer sound if the air flow velocity falls below a predetermined minimum value. The user is typically notified about the insufficient air flow velocity by generating a buzzer sound.

With a typical dust extractor, the user may need to interact with the dust extractor in a situation where the air flow rate is not sufficient. The user may need to manually increase power level, in a situation where the air flow rate is not sufficient.

SUMMARY

An object of the invention is to provide a dust extractor device. An object of the invention is to provide an apparatus, which comprises a dust extractor device. An object of the invention is to provide a method for extracting dust. An object of the invention is to provide a method for processing a surface.

According to an aspect, there is provided a dust extractor device (500), comprising:
- a fan (FAN1) for causing an air flow (AIR1),
- a motor (MOTOR1) to rotate the fan (FAN1),
- a dust separator (FIL1) to separate dust particles (DUST1) from the air flow (AIR1),
- a flow measuring unit (FSEN1) for measuring air flow rate ($Q_{AIR1}$) of the air flow (AIR1), and
- a control unit (CNT1) configured to adjust electric power ($P_{500}$) of the motor (MOTOR1) based on the measured air flow rate ($Q_{AIR1}$).

The scope of protection sought for various embodiments of the invention is set out by the independent claims. The embodiments, if any, described in this specification that do not fall under the scope of the independent claims are to be interpreted as examples useful for understanding various embodiments of the invention.

The control unit of the dust extractor may be configured to adjust the power level of the motor based on the measured air flow rate. Said control may e.g. reduce electric energy needed for extracting a given amount of dust with the dust extractor. Said control may e.g. increase the operating lifetime of the motor. Said control may e.g. allow more continuous dust extraction and/or surface processing, by reducing the need to interrupt the work due to insufficient air flow rate. Said control may e.g. reduce noise level of the dust extractor.

Based on the air flow rate measurement, if the measured air flow rate is not sufficient with the currently selected hose diameter and power setting, the power setting of the motor may be increased to provide sufficient dust extraction. If a sufficient dust extraction is not achieved even at the highest power level of the motor, a buzzer may be activated, so as to let the user know that a sufficient dust extraction was not achieved.

If the measured air flow rate is too low, the control unit may increase the rotation speed of the motor until the measured air flow rate is at a sufficient level.

If sufficient air flow is not achieved at the maximum rotation speed of the motor, the control system may initiate an alarm signal. The alarm signal may be e.g. an audible alarm signal. For example, if sufficient air flow is not achieved at the highest power level the buzzer may be activated thus letting the user know that a sufficient air flow was not reached.

In an embodiment, the flow sensor may be implemented by using pressure sensors and a rotation speed signal. The control system may be arranged to calculate the air flow rate from the pressure difference over the suction fan and from the rotation speed of the suction fan. The control system may form a flow rate signal indicative of the measured air flow rate. The control unit may adjust the power of the motor based on the flow rate signal.

The device may receive a hose diameter value via a user interface. The control system may determine a minimum air flow rate based the hose diameter value. The control system may adjust the power of the motor so as to keep the measured air flow above the determined minimum flow rate limit. If the measured air flow rate is lower than the determined minimum air flow rate, then the control unit may increase the power of the motor until the measured air flow rate reaches the needed flow rate, provided that the power of the motor remains lower than or equal to the maximum allowed power of the motor.

The device may receive a hose diameter value and a target power value via the user interface. The control system may determine a target flow rate value based the hose diameter value and based on the target power value. The control system may determine a target air flow rate based the hose diameter value and based on the target power value. If the measured air flow rate is lower than the determined target air flow rate, then the control unit may increase the power of the motor until the measured air flow rate reaches the target value, provided that the power of the motor remains lower than or equal to the maximum allowed power of the motor.

In an embodiment, the device may have quiet operating mode, where the motor and the fan are arranged to operate near the alarm flow rate limit in order to reduce or minimize emission of acoustic noise. The control unit may be arranged to adjust the power of the motor so as to keep the measured air flow rate a little bit over the alarm flow rate limit. The control unit may be arranged to adjust the power of the motor so as to keep the measured air flow rate substantially equal to a target air flow rate. The target air flow rate may be e.g. 10% higher than the alarm flow rate limit. The control unit may be arranged to adjust the power of the motor so as to keep the measured air flow rate above the alarm flow rate limit with a margin. The width of the margin may be e.g.

20% of the alarm flow rate limit. For example, the control unit may be arranged to adjust the power so that the measured air flow rate is greater than the alarm flow rate limit and smaller than 1.2 times the alarm flow rate limit.

BRIEF DESCRIPTION OF THE DRAWINGS

In the following examples, several variations will be described in more detail with reference to the appended drawings, in which.

DETAILED DESCRIPTION

Figure 1:
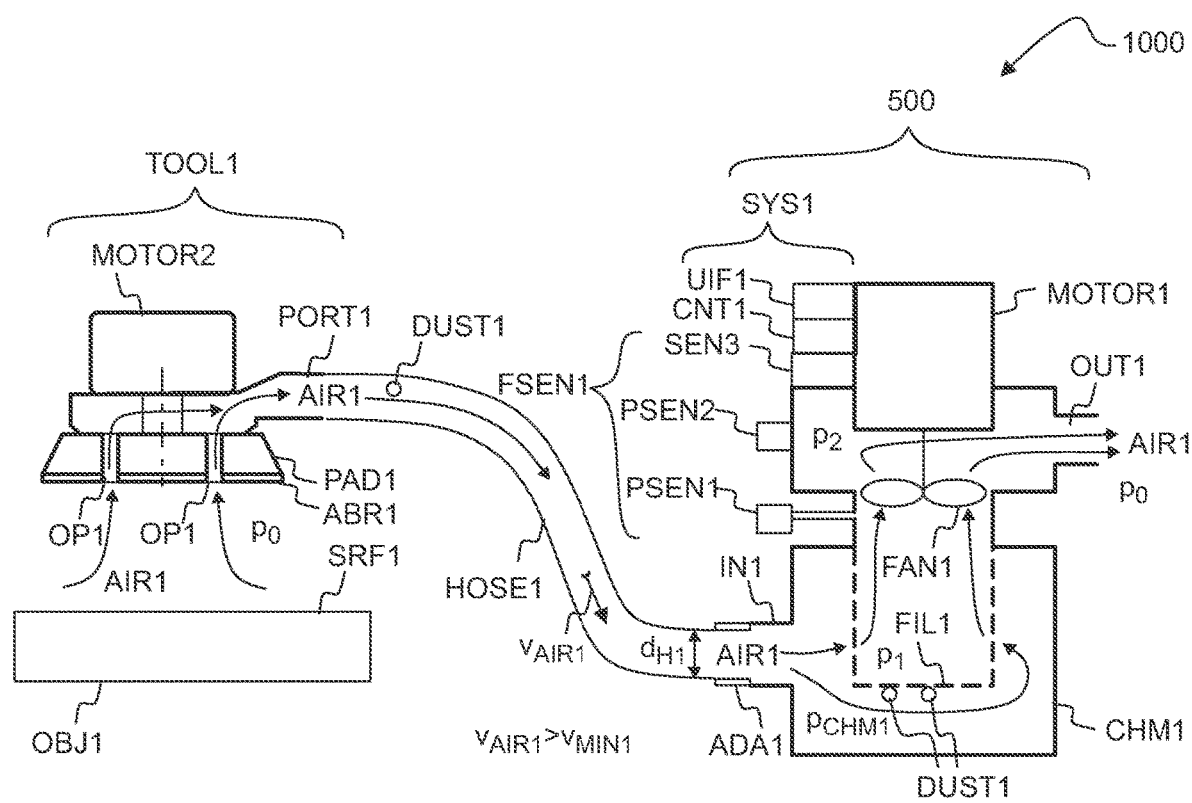
FIG. 1 shows, by way of example, a surface processing system, which comprises a dust extractor.

Referring to FIG. 1, the dust extractor 500 may comprise a rotating suction fan FAN1 to cause a partial vacuum ($p_1$), which in turn may draw an air flow AIR1 through a hose HOSE1 connected to the dust extractor 500. The dust extractor 500 may comprise a motor MOTOR1 for rotating the suction fan FAN1. Increasing the rotation speed $N_{RPM}$ of the motor MOTOR1 and the fan FAN1 may cause a lower inner pressure $p_1$, thereby increasing the air flow rate $Q_{AIR1}$ through the hose HOSE1 and through the suction fan FAN1. Decreasing the rotation speed of the motor MOTOR1 may cause a higher inner pressure $p_1$, thereby decreasing the air flow rate $Q_{AIR1}$.

Increasing the rotation speed may increase consumption of electric energy and/or may shorten operating lifetime of the motor. Decreasing the rotation speed may decrease consumption of electric energy and/or may increase operating lifetime of the motor.

The dust extractor 500 may be arranged to suck dust particles DUST1, which are carried by the air flow AIR1. The dust extractor 500 may also be called e.g. as a vacuum cleaner.

The dust extractor 500 may comprise a particle separator FIL1 to separate dust particles DUST1 from the air flow AIR1. The particle separator FIL1 may comprise e.g. a filter and/or a cyclone. The particle separator FIL1 may collect the separated dust particles DUST1. The suction fan FAN1 may draw the air flow AIR1 through the particle separator FIL1.

An apparatus 1000 for extracting dust DUST1 may comprise the dust extractor 500 and a hose HOSE1 connected to the dust extractor 500. The hose HOSE1 may convey an air flow AIR1 and dust particles DUST1 to the dust extractor 500. The hose HOSE1 may convey an air flow AIR1 and dust particles DUST1 e.g. from a working area of a power tool TOOL1 to the dust extractor 500. The apparatus 100 may optionally comprise a tool TOOL1. The tool TOOL1 may be e.g. a sander, a drilling machine, or a sawing machine.

The apparatus 1000 may be e.g. a surface processing apparatus. The surface processing apparatus 1000 may further comprise a power tool TOOL1 for processing a surface SRF1 of an object OBJ1. The power tool TOOL1 may be e.g. a rotary sander, an orbital sander or a belt sander. The power tool TOOL1 may comprise an abrasive article ABR1, which comprises abrasive grains. The tool TOOL1 may comprise a supporting pad PAD1. The abrasive article ABR1 may be attached to the pad PAD1. The tool TOOL1 may comprise a motor MOTOR2 for causing a movement of the abrasive article ABR1 with respect to the surface SRF1. The tool TOOL1 may comprise a motor MOTOR2 for causing rotary and/or oscillatory movement of the abrasive article ABR1 with respect to the surface SRF1. Pressing the abrasive article ABR1 against the surface SRF1 may generate dust particles DUST1, which may comprise particles released from the surface SRF1 and/or particles released from the abrasive article ABR1. The tool TOOL1 may comprise one or more openings OP1 for extracting the released particles DUST1 together with an air flow AIR1. The dust extractor 500 may be arranged to draw the dust-laden air flow AIR1 via the openings OP1 and via a flexible hose HOSE1 to the inlet IN1 of the dust extractor 500.

The hose HOSE1 may operate as a flexible conduit for guiding the dust-laden air flow AIR1. The hose HOSE1 may guide dust particles DUST1 together with the air flow AIR1 from a port PORT1 of the tool TOOL1 to the inlet IN1 of the dust extractor 500. The suction hose HOSE1 may be detachably connectable to the inlet IN1.

The inner diameter of the hose HOSE1 may also be different from the inner diameter of the inlet IN1. The hose HOSE1 may be connected to the inlet IN1 e.g. by using an adapter connector ADA1. Hoses of several different diameters may be connected to the same dust extractor 500. For example, a first hose having a first inner diameter ($d_{H1}=d_1$) may be connected to the dust extractor 500 during a first time period, and a second hose having a second different inner diameter ($d_{H1}=d_2$) may be connected to the dust extractor 500 during a second time period. The inner diameter ($h_{H1}$) of the hose HOSE1 may have an effect on the flow resistance and on the flow velocity of air flow guided via the hose.

Operating safety of a user may require that the air flow velocity ($v_{AIR1}$) in the hose HOSE1 is greater than or equal to a minimum flow velocity value ($v_{min1}$). The minimum flow velocity value may be e.g. 20 m/s. The minimum flow velocity (m/s) may determine a corresponding minimum air flow rate (L/s) for each inner diameter of the hose. L denotes liter. The unit of flow velocity may be e.g. m/s. The unit of flow rate may be e.g. L/s.

The inner diameter $d_{H1}$ of the hose HOSE1 may be e.g. 18 mm. The cross-sectional shape of the hose may be substantially circular. When the hose diameter $d_{H1}$=18 mm, then the condition $v_{AIR1} \geq 20$ m/s may be ensured by keeping the air flow rate greater than or equal to 5.1 L/s.

The inner diameter $d_{H1}$ of the hose HOSE1 may be e.g. 40 mm. When the hose diameter $d_{H1}$=40 mm, then the condition $v_{AIR1} \geq 20$ m/s may be ensured by keeping the air flow rate greater than or equal to 25.1 L/s.

$p_0$ denotes the ambient atmospheric pressure. Pressure near the power tool TOOL1 and at the outlet OUT1 of the dust extractor 500 may be substantially equal to the atmospheric pressure $p_0$. The ambient pressure $p_0$ is typically substantially equal to 101.3 kPa. $p_{CHM1}$ denotes an internal pressure of the inlet chamber CHM1 of the dust extractor 500. The pressure $p_{CHM1}$ may also denote the upstream pressure of the particle separator FIL1 (e.g. filter). The pressure difference $p_0 - p_{CHM1}$ may draw the dust-laded air flow AIR1 from the abrasive article ABR1 to the inlet chamber CHM1 of the dust extractor 500 via the flexible hose HOSE1.

The rotating fan FAN1 may cause the partial vacuum $p_1$, which prevails between the particle separator FIL1 and the fan FAN1. $p_1$ denotes an upstream pressure of the fan FAN1 and downstream pressure of the particle separator FIL1. The pressure $p_1$ may be the lowest pressure of the apparatus 1000. $p_2$ denotes a downstream pressure of the fan FAN1. The maximum pressure difference $(p_2-p_1)$ over the fan FAN1 may be e.g. in the range of 5 to 30 kPa.

The dust extractor 500 may comprise a control unit CNT1 for adjusting electric power of the motor MOTOR1 based on the measured air flow rate $Q_{AIR1}$. The dust extractor 500 may comprise a control unit CNT1 for controlling rotation speed of the motor MOTOR1 based on the measured air flow rate $Q_{AIR1}$. The dust extractor 500 may comprise a flow measuring unit FSEN1 for measuring the air flow rate $Q_{AIR1}$.

The dust extractor 500 may comprise one or more pressure sensors PSEN1, PSEN2 for measuring the pressure difference $p_2-p_1$ over the fan FAN1. In an embodiment, the flow measuring unit FSEN1 may be implemented by measuring the pressure difference $p_2-p_1$, and by calculating the measured flow rate $Q_{AIR1}$ from the measured pressure difference $p_2-p_1$ and from the measured rotation speed of the fan FAN1. Consequently, the flow rate may be accurately measured with a minimum number of additional components. In particular, there is no need to use an additional constriction in order to measure the air flow rate.

The dust extractor 500 may comprise a user interface UIF1 for receiving user input from a user and/or for providing information to the user. For example, the user may set a target power value $P_{T1}$ and/or a hose diameter value $d_{H1}$ by using the user interface UIF1. The control unit CNT1 may subsequently control operation of the dust extractor 500 according to the target power value $P_{T1}$ and according to the hose diameter value $d_{H1}$.

Figure 3A:
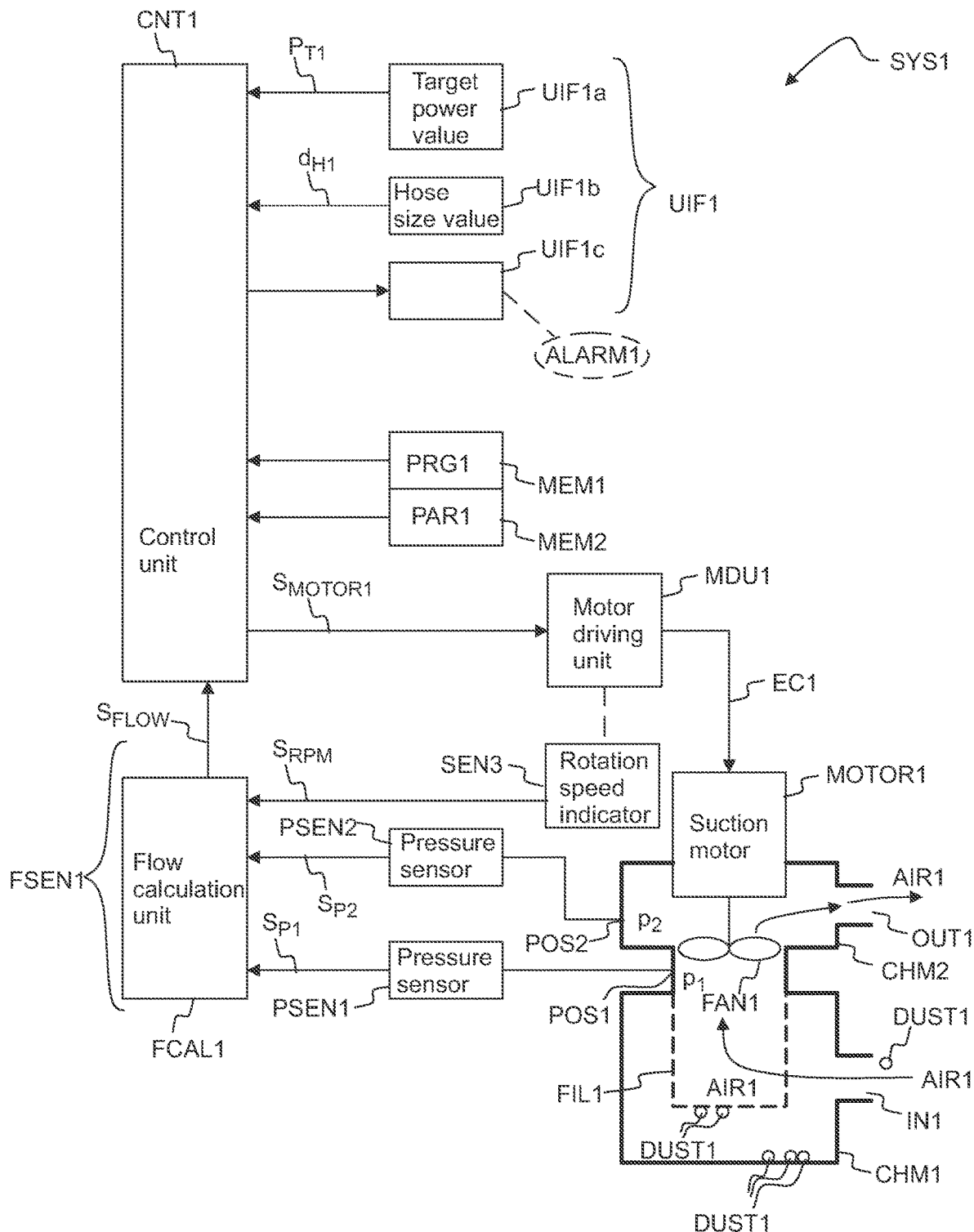
FIG. 3a shows, by way of example, the control system of the dust extractor.

The control system SYS1 of the dust extractor 500 may comprise the control unit CNT1 and the flow measuring unit FSEN1. The control system SYS1 may comprise the user interface UIF1. The control system SYS1 may comprise a motor driving unit MDU1 for driving the motor MOTOR1 (FIG. 3a).

Figure 2:
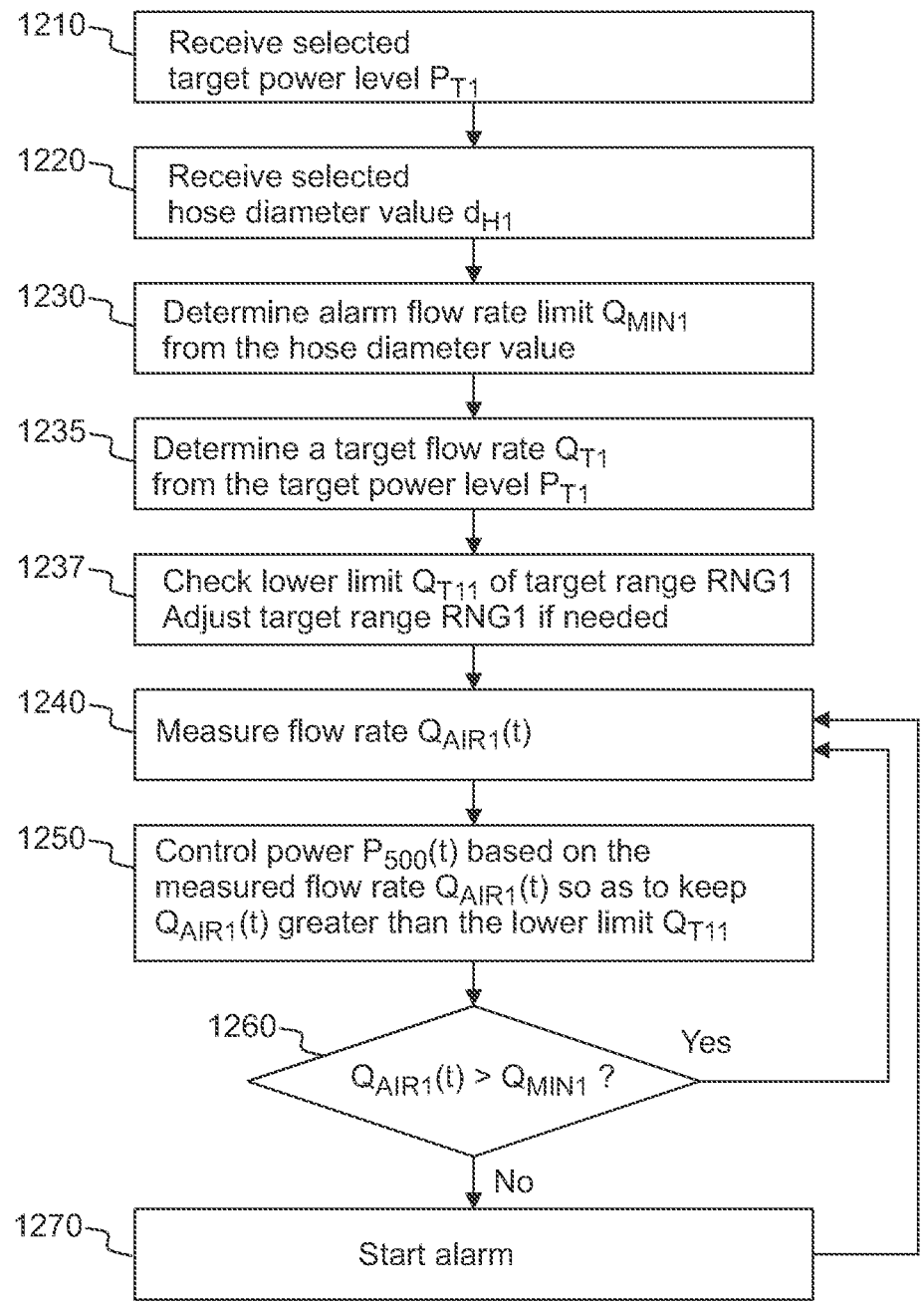
FIG. 2 shows, by way of example, method steps for controlling operation of the dust extractor.

FIG. 2 shows, by way of example, method steps for controlling operation of the dust extractor 500.

A target power value $P_{T1}$ may be inputted to the control system SYS1 in step #1210. The target power value $P_{T1}$ may be inputted e.g. by using a user interface (UIF1a).

A hose diameter value $d_{H1}$ may be inputted to the control system SYS1 in step #1220. The hose diameter value $d_{H1}$ may correspond to the inner diameter of the hose HOSE1, which is connected to the dust extractor 500. The hose diameter value $d_{H1}$ may be inputted e.g. by using a user interface (UIF1b).

An alarm flow rate limit $Q_{MIN1}$ may be determined from the hose diameter value $d_{H1}$ in step #1230. The alarm flow rate limit $Q_{MIN1}$ may be determined so as to ensure that the flow velocity is e.g. greater than or equal to an alarm limit value $v_{min1}$ in the hose HOSE1, which has the inner diameter $d_{H1}$. The alarm limit value $v_{min1}$ of the velocity may be e.g. 20 m/s.

The target flow rate $Q_{T1}$ may be determined in step #1235.

The control system SYS1 may determine the target air flow rate $Q_{T1}$ from the selected target power level $P_{T1}$. The control system SYS1 may determine a target air flow rate $Q_{T1}$ from the selected target power level $P_{T1}$ according to a control function $Q_{T1}(P_{T1})$. For example, the control system SYS1 may determine a target air flow rate $Q_{T1}$ from the selected target power level $P_{T1}$ such that the target air flow rate $Q_{T1}$ corresponds to the selected target power level $P_{T1}$ in a reference situation where the dust separator (filter FIL1) is clean, and only an unobstructed suction hose (HOSE1) having a predetermined nominal size is connected to the inlet IN1.

The target flow rate $Q_{T1}$ may also be determined from the target power value $P_{T1}$ by taking into account the additional condition that the target flow rate $Q_{T1}$ must be greater than or equal to the alarm flow rate limit $Q_{MIN1}$. The target flow rate $Q_{T1}$ may be increased e.g. if a first target flow rate value candidate ($Q_{T1}$) determined from the target power value $P_{T1}$ is lower than the alarm flow rate limit $Q_{MIN1}$.

The control system SYS1 may be configured to determine the target flow rate $Q_{T1}$ from the target power value $P_{T1}$ so that the determined target flow rate $Q_{T1}$ is substantially greater than the alarm flow rate limit $Q_{MIN1}$, in order to provide a margin of safety.

The control system SYS1 may be configured to determine the target flow rate $Q_{T1}$ from the target power value $P_{T1}$ so that the determined target flow rate $Q_{T1}$ is e.g. at least 10% greater than the alarm flow rate limit $Q_{MIN1}$.

The control system SYS1 may be arranged to keep the measured air flow rate ($Q_{AIR1}(t)$) substantially equal to the target air flow rate $Q_{T1}$. For example, the control unit CNT1 may be arranged to adjust the rotation speed ($N_{RPM}$) of the motor MOTOR1 based on the measured air flow rate $Q_{AIR1}$ so as to keep the difference ($Q_{T1}-Q_{AIR1}$) between the target flow rate $Q_{T1}$ and the measured air flow rate $Q_{AIR1}$ smaller than 10% times the target flow rate $Q_{T1}$.

For example, the control unit CNT1 may be arranged to adjust the rotation speed ($N_{RPM}$) of the motor MOTOR1 based on the measured air flow rate $Q_{AIR1}$ so as to keep the difference ($Q_{T1}-Q_{AIR1}$) between the target flow rate $Q_{T1}$ and the measured air flow rate $Q_{AIR1}$ smaller than the half width ($HW_{RNG1} \cdot Q_{T1}$) of the range target flow rate range RNG1.

The coefficient $HW_{RNG1}$ may be e.g. in the range of 2% to 20%. The coefficient $HW_{RNG1}$ may be called e.g. as the relative half width of the target flow rate range RNG1.

The target flow rate range RNG1 may correspond to the target power value $P_{T1}$, and the control system may be arranged to keep the measured air flow rate ($Q_{AIR1}(t)$) within the target flow rate range RNG1.

The target flow rate range RNG1 has a lower limit $Q_{T11}$ and an upper limit $Q_{T12}$. The symbol $HW_{RNG1}$ denotes the relative half width of the target flow rate range RNG1. $HW_{RNG1}=(Q_{T12}-Q_{T11})/(Q_{T12}+Q_{T11})$. The relative half width $HW_{RNG1}$ may be e.g. in the range of 2% to 20%. The difference between the upper limit $Q_{T12}$ and the midpoint $(Q_{T12}+Q_{T11})/2$ of the target flow rate range RNG1 is equal to $HW_{RNG1}$ times the midpoint $(Q_{T12}+Q_{T11})/2$. The difference between the midpoint $(Q_{T12}+Q_{T11})/2$ and the lower limit $Q_{T11}$ is equal to $HW_{RNG1}$ times the midpoint $(Q_{T12}+Q_{T11})/2$. The midpoint $((Q_{T12}+Q_{T11})/2)$ of the target flow rate range RNG1 may be e.g. substantially equal to the target air flow rate $Q_{T1}$.

The lower limit $Q_{T11}$ of the target flow rate range RNG1 may be checked in step #1237. If needed, the target flow rate range RNG1 may be adjusted to ensure that the lower limit $Q_{T11}$ is greater than or equal to the alarm flow rate limit $Q_{MIN1}$. For example, the target flow rate range RNG1 may be shifted such that the lower limit $Q_{T11}$ is greater than or equal to the alarm flow rate limit $Q_{MIN1}$. For example, the target air flow rate $Q_{T1}$ may be increased such that the lower limit $Q_{T11}$ of the target flow rate range RNG1 is greater than or equal to the alarm flow rate limit $Q_{MIN1}$.

The control system SYS1 may determine a minimum value for the target air flow rate $Q_{T1}$ based on the alarm flow rate limit $Q_{MIN1}$. If the target air flow rate $Q_{T1}$ is lower than the minimum value, then the control system SYS1 may adjust the target air flow rate $Q_{T1}$ to be greater than or equal to the minimum value to ensure that that the lower limit $Q_{T11}$ of the target flow rate range RNG1 is greater than or equal to the alarm flow rate limit $Q_{MIN1}$.

A candidate target air flow rate ($Q_{T1}$) and a candidate lower limit ($Q_{T11}$) may be determined from the inputted target power value $P_{T1}$. The candidate lower limit ($Q_{T11}$) may be determined from the candidate target air flow rate ($Q_{T1}$) e.g. by using a predetermined half width $HW_{RNG1}$ of the target flow rate range RNG1. The control system SYS1 may determine the (final) target flow rate $Q_{T1}$ such that the lower limit $Q_{T11}$ of the target flow rate range RNG1 is equal to the candidate value ($Q_{T11}$) or equal to $(1+K_{SM})$ times the alarm flow rate limit $Q_{MIN1}$, whichever is higher. The safety margin $K_{SM}$ may be e.g. in the range of 0% to 100%. The safety margin $K_{SM}$ may also be e.g. in the range of 10% to 100%, in order to provide improved safety and/or in order to avoid triggering an unjustified alarm during normal operation.

The air flow rate $Q_{AIR1}(t)$ may be measured in step #1240.

The power ($P_{500}$) and/or rotation speed $N_{RPM}(t)$ of the motor MOTOR1 may be controlled based on the measured air flow rate $Q_{AIR1}(t)$ in step #1250.

The power ($P_{500}$) and/or rotation speed $N_{RPM}(t)$ of the motor MOTOR1 may be adjusted based on the measured air flow rate $Q_{AIR1}(t)$.

The power ($P_{500}$) and/or rotation speed $N_{RPM}(t)$ of the motor MOTOR1 may be adjusted based on the measured air flow rate $Q_{AIR1}(t)$, so as to keep the measured air flow rate $Q_{AIR1}(t)$ substantially equal to the target air flow rate $Q_{T1}$. The power ($P_{500}$) and/or rotation speed $N_{RPM}(t)$ of the motor MOTOR1 may be increased if the measured air flow rate $Q_{AIR1}(t)$ is smaller than the target flow rate $Q_{T1}$.

The power ($P_{500}$) and/or rotation speed $N_{RPM}(t)$ of the motor MOTOR1 may be adjusted based on the measured air flow rate $Q_{AIR1}(t)$, so as to keep the measured air flow rate $Q_{AIR1}(t)$ greater than or equal to the lower limit $Q_{T11}$.

The power ($P_{500}$) and/or rotation speed $N_{RPM}(t)$ of the motor MOTOR1 may be adjusted based on the measured air flow rate $Q_{AIR1}(t)$, so as to keep the measured air flow rate $Q_{AIR1}(t)$ within the target range RNG1.

The control unit CNT1 may be arranged to adjust the rotation speed $N_{RPM}$ of the motor MOTOR1 based on the measured air flow rate $Q_{AIR1}$ so as to keep the measured air flow rate $Q_{AIR1}$ within the target flow rate range RNG1.

The control unit CNT1 may keep the measured air flow rate $Q_{AIR1}$ higher than the alarm flow rate limit $Q_{MIN1}$.

The control unit CNT1 may keep the measured air flow rate QAIR1 substantially equal to the target air flow rate $Q_{T1}$.

The control unit CNT1 may comprise e.g. a PID controller. One or more control parameters of the PID controller may be selected such that the control unit CNT1 causes the dust extractor 500 to keep the measured air flow rate $Q_{AIR1}$ substantially equal to the target air flow rate $Q_{T1}$, by adjusting the rotation speed based on the measured air flow rate.

One or more control parameters of the PID controller may be selected such that the control unit CNT1 causes the dust extractor 500 to keep the measured air flow rate $Q_{AIR1}$ within the target flow rate range RNG1, by adjusting the rotation speed based on the measured air flow rate.

One or more control parameters of the PID controller may be selected such that the control unit CNT1 causes the dust extractor 500 to keep the measured air flow rate $Q_{AIR1}$ higher than the alarm flow rate limit $Q_{MIN1}$, by adjusting the rotation speed based on the measured air flow rate.

The measured air flow rate $Q_{AIR1}(t)$ may be compared with a minimum value $Q_{MIN}$ in step #1260.

The control system SYS1 may start an alarm signal if the measured air flow rate $Q_{AIR1}(t)$ is lower than the minimum value $Q_{MIN}$ (step #1270).

The control system SYS1 may continue normal operation if the measured air flow rate $Q_{AIR1}(t)$ is higher than the minimum value $Q_{MIN}$. The control system SYS1 may repeat the steps #1240-#1260.

FIG. 3a shows, by way of example, a control system SYS1 of the dust extractor device 500.

The control system SYS1 may comprise a control unit CNT1 for controlling rotation speed $N_{RPM}(t)$ of the motor MOTOR1 based on the measured air flow rate $Q_{AIR1}(t)$. The control unit CNT1 may be implemented e.g. by one or more data processors. The control system SYS1 may comprise a machine-readable memory MEM1 for storing computer program code PRG1. The program code PRG1, when executed by one or more processors of the control unit CNT1 may cause the control unit CNT1 to control electric power $P_{500}$ and/or rotation speed $N_{RPM}(t)$ of the motor MOTOR1 based on the measured air flow rate $Q_{AIR1}(t)$. The control system SYS1 may comprise a machine-readable memory MEM2 for storing operating parameters PAR1 of the extractor device 500. The operating parameters PAR1 may specify e.g. a minimum flow velocity VMIN1. The operating parameters PAR1 may specify e.g. a minimum air flow rates $Q_{MIN1}$ for different hose diameters $d_{H1}$.

The control system SYS1 may comprise a user interface UIF1 for receiving user input from a user. The user interface UIF1 may also provide information to the user.

The user interface UIF1 may comprise an input device UIF1a for inputting a target power setting $P_{T1}$. The user interface UIF1 may comprise an input device UIF1b for inputting a hose diameter value $d_{H1}$. The user interface UIF1 may comprise an output device UIF1c for providing an alarm signal ALARM1 to the user, e.g. an alarm sound signal and/or a visual alarm signal.

The control system SYS1 may comprise a flow measuring unit FSEN1 for measuring the air flow rate $Q_{AIR1}$ of the air flow AIR1, which is drawn via the inlet IN1 by the fan FAN1.

The flow measuring unit FSEN1 may provide a flow rate signal $S_{FLOW}$ indicative of the measured air flow rate $Q_{AIR1}$(t) of the air flow AIR1 passing through the fan FAN1. The control unit CNT1 may control operation of the motor MOTOR1 based on the flow rate signal $S_{FLOW}$. The control unit CNT1 may adjust the power $P_{500}$ and/or the rotation speed $N_{RPM}$ of the motor MOTOR1 based on the flow rate signal $S_{FLOW}$. The flow rate signal $S_{FLOW}$ may be e.g. a digital signal in order to facilitate reliable data processing operations.

In an embodiment, the flow measuring unit FSEN1 may comprise a flow calculation unit FCAL1. The flow calculation unit FCAL1 may be configured to calculate the measured air flow rate $Q_{AIR1}$(t) from the pressure difference $p_2-p_1$ and from the rotation speed of the FAN1. The flow calculation unit FCAL1 may be implemented e.g. by one or more data processors (PROC1). The flow calculation unit FCAL1 may be implemented e.g. by a calculation algorithm running on one or more data processors (PROC1). The flow calculation unit FCAL1 may form the flow rate signal $S_{FLOW}$.

The flow measuring unit FSEN1 may comprise one or more pressure sensors PSEN1, PSEN2 for measuring a pressure difference $p_2-p_1$ over the fan FAN1.

For example, a first pressure sensor PSEN1 may measure an upstream pressure $p_1$ of the fan FAN1 at a first position POS1. For example, a second pressure sensor PSEN2 may measure a downstream pressure $p_2$ of the fan FAN1 at a second position POS2. Alternatively, a pressure difference sensor (e.g. PSEN1) may be arranged to measure the pressure difference $p_2-p_1$ between the positions POS2, POS1. The first pressure sensor PSEN1 may form a pressure signal $S_{P1}$ indicative of the pressure $p_1$ or the pressure difference $p_2-p_1$. The second pressure sensor PSEN2 may form a pressure signal $S_{P2}$ indicative of the pressure $p_2$.

The control system SYS1 may comprise a rotation speed indicator SEN3 for providing a signal $S_{RPM}$ indicative of the rotation speed of the FAN1. The control system SYS1 may be arranged to measure the flow rate $Q_{AIR1}$ by calculating the flow rate $Q_{AIR1}$ from the measured pressure difference $p_2-p_1$ and from the rotation speed of the fan FAN1. The control system SYS1 may be arranged to measure the flow rate $Q_{AIR1}$ from one or more signals $S_{P1}$, $S_{P2}$ of the pressure sensors PSEN1, PSEN2 and from the rotation speed signal $S_{RPM}$. The control system SYS1 may be arranged to calculate the flow rate $Q_{AIR1}$ by using the signals $S_{RPM}$, $S_{P1}$, $S_{P2}$. The control system SYS1 may be arranged to calculate the flow rate $Q_{AIR1}$ from the measured pressure difference $p_2-p_1$ and from the rotation speed e.g. by using a regression function. Parameter values specifying the regression function may be stored in a memory (e.g. MEM2) of the control system SYS1.

The fan FAN1 may be e.g. an axial fan and/or a centrifugal fan. The pressure difference ($p_2-p_1$) over the fan FAN1 may depend on the air flow rate $Q_{AIR1}$ and on the rotation speed of the fan FAN1. Consequently, the air flow rate $Q_{AIR1}$ may be calculated from the measured pressure difference ($p_2-p_1$) and from the rotation speed of the fan FAN1.

The rotation speed indicator SEN3 may form the rotation speed signal $S_{RPM}$ e.g. from a frequency of a driving electric current EC1 of the motor MOTOR1. The rotation speed indicator SEN3 may form the rotation speed signal $S_{RPM}$ e.g. from a commutation frequency of the motor MOTOR1. The rotation speed indicator SEN3 may comprise a sensor for measuring the rotation speed of the motor MOTOR1 and/or to measure the rotation speed of the fan FAN1.

The rotation speed signal $S_{RPM}$ may be indicative of the measured rotation speed of the motor MOTOR1 and/or indicative of the measured rotation speed of the fan FAN1. The rotation speed of the fan FAN1 may be proportional to the rotation speed of the motor MOTOR1. The rotation speed of the fan FAN1 may be equal to the rotation speed of the motor MOTOR1. The rotation speed of the FAN1 may be determined from the rotation speed of the motor MOTOR1. The rotation speed of the motor MOTOR1 may be determined from the rotation speed of the fan FAN1, respectively.

The motor MOTOR1 may be e.g. an asynchronous or synchronous electric motor. The motor MOTOR1 may be e.g. an alternating current motor or a direct current motor. The motor MOTOR1 may be e.g. an universal motor. The motor MOTOR1 may be e.g. brushless direct current motor.

The control system SYS1 may comprise a motor driving unit MDU1 for providing one or more electric currents EC1 to the motor MOTOR1 according to motor control signal $S_{MOTOR1}$. The motor driving unit MDU1 may comprise e.g. power transistors and/or thyristors for providing the electric currents EC1 for the motor MOTOR1. The motor driving unit MDU1 may provide one or more electric currents EC1 in response to a motor control signal $S_{MOTOR1}$. The control unit CNT1 may form the motor control signal $S_{MOTOR1}$ based on the measured air flow rate $Q_{AIR1}$.

In an embodiment, the rotation speed indicator SEN3 may determine the rotation speed of the fan FAN1 from the motor control signal $S_{MOTOR1}$ and/or from the frequency of the one or more electric currents EC1.

The dust extractor device 500 may comprise a dust chamber CHM1 for guiding the dust-laded air flow AIR1 from the inlet IN1 to the dust separator FIL1 and/or for collecting the separated dust DUST1. The dust extractor device 500 may comprise an air flow chamber CHM2 for guiding the air flow AIR1 from the fan FAN1 to the outlet OUT1.

Figure 3B:
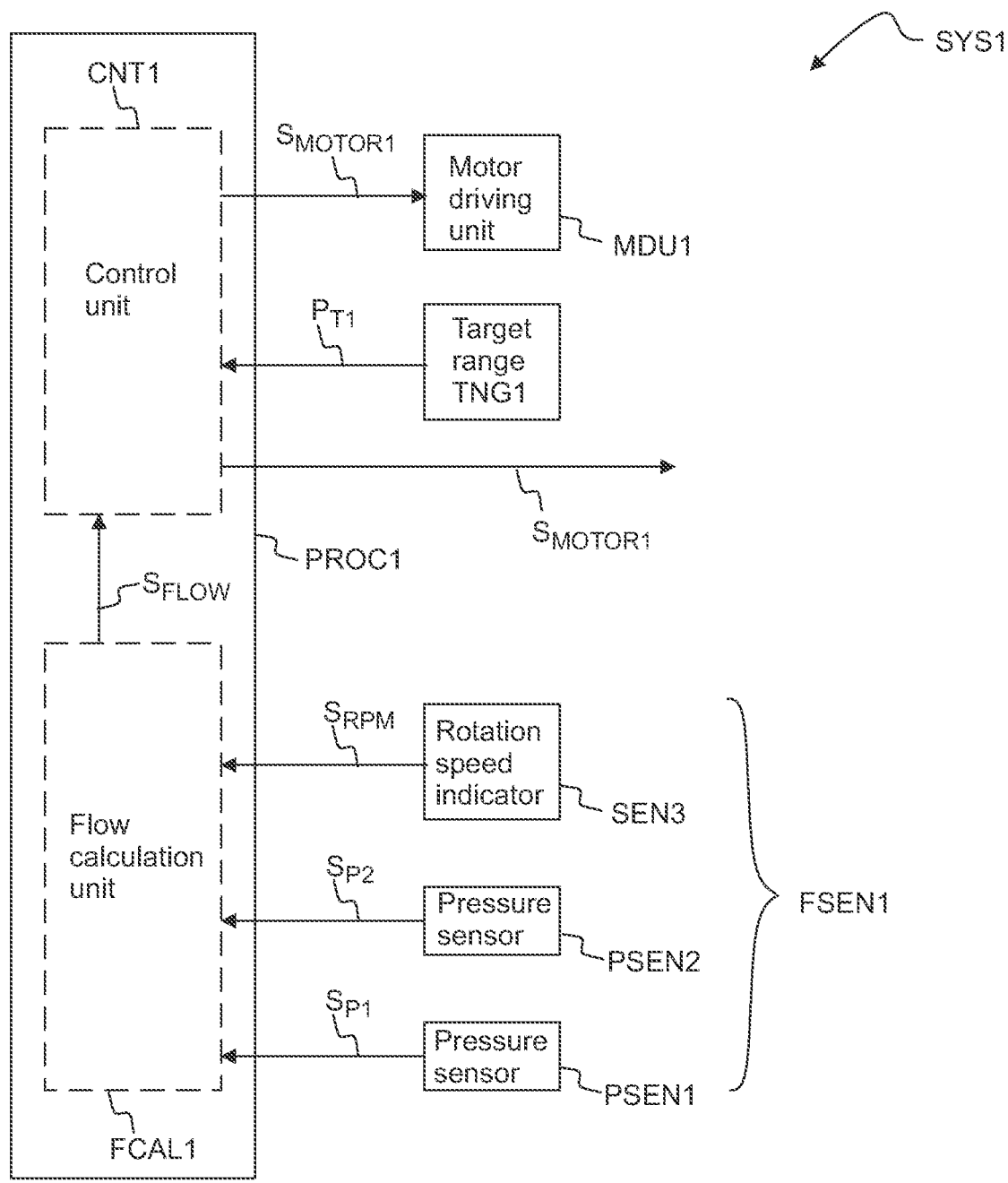
FIG. 3b shows, by way of example, providing a flow rate signal for the control unit.

FIG. 3b shows providing the flow rate signal $S_{FLOW}$ to the control unit CNT1. The control system SYS1 may comprise a flow calculation unit FCAL1 for forming the flow rate signal $S_{FLOW}$. The flow calculation unit FCAL1 may calculate the flow rate $Q_{AIR1}$ from the measured pressure difference $p_2-p_1$ and from the rotation speed of the fan FAN1.

The control unit CNT1 may be implemented e.g. by executing program code PRG1 by one or more data processors PROC1 of the control system SYS1. Also the flow calculation unit FCAL1 may be implemented by executing program code by one or more data processors PROC1 of the control system SYS1. In an embodiment, one or more data processors PROC1 may be arranged to carry out data processing for the control unit CNT1 and also for the flow calculation unit FCAL1.

Figure 4A:
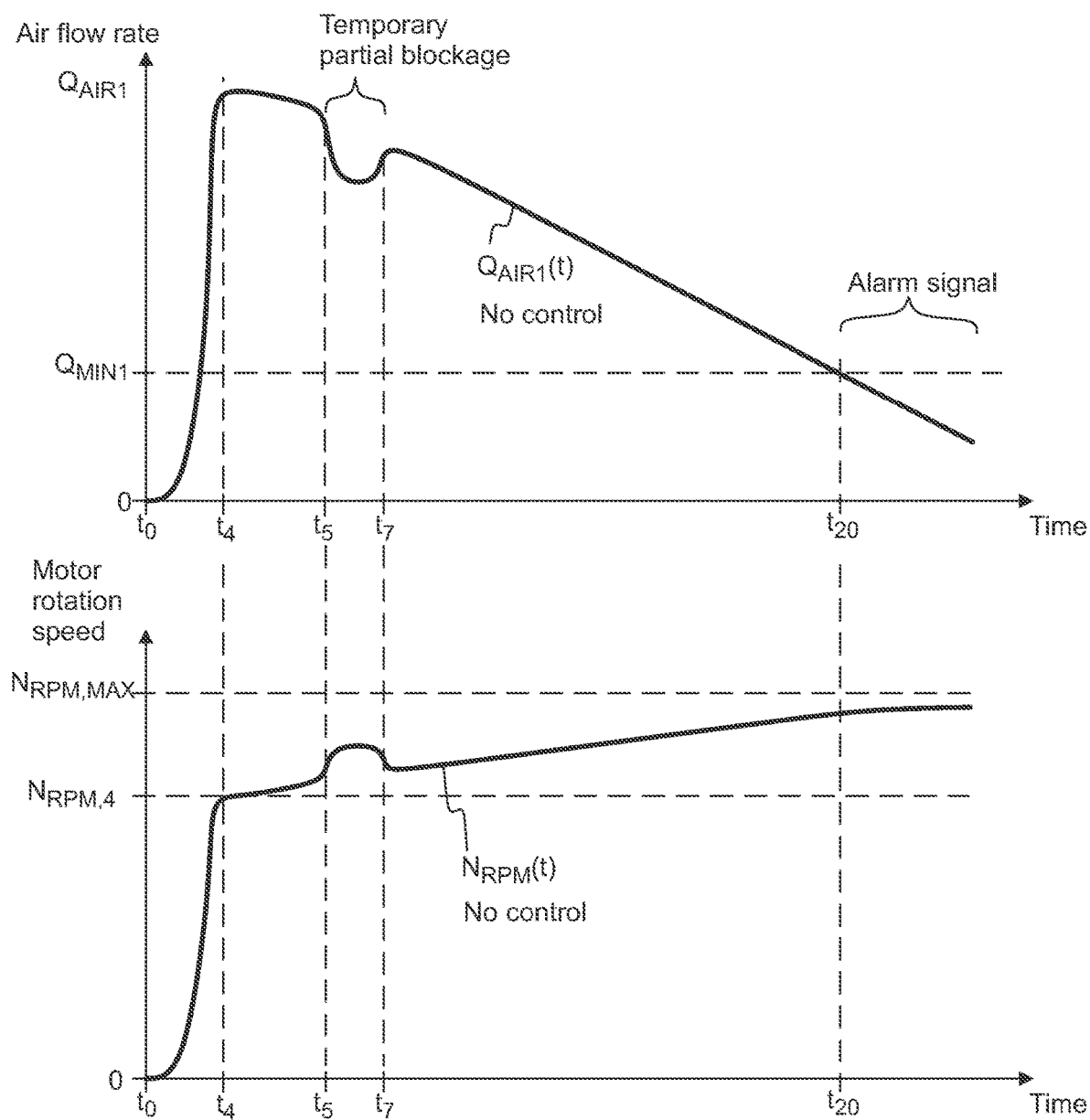
FIG. 4a shows temporal evolution of flow rate in a comparative example.

FIG. 4a shows a comparative example where the motor of the dust extractor is driven with a constant RMS voltage level, e.g. with 230 V 50 Hz alternating voltage. RMS means root mean square. The motor may be e.g. a universal motor. In this comparative example, the control unit does not control the rotation speed based on the measured air flow rate. The upper curve shows temporal evolution of the measured air flow rate $Q_{AIR1}(t)$, and the lower curve shows the rotation speed $N_{RPM}(t)$ of the motor MOTOR1.

The motor may be started in the beginning (at time $t_0$). The rotation speed $N_{RPM}(t)$ may reach a steady state value $N_{RPM,4}$ at a time $t_4$. The flow rate $Q_{AIR1}(t)$ may reach a maximum value at the time $t_4$. The symbol t denotes time.

A dust source may provide dust particles. For example, the power tool TOOL1 may operate as a dust source. To the first approximation, the dust source (TOOL1) may be assumed to generate dust DUST1 at a constant rate (e.g. 0.1 g/s). To the first approximation, the dust extractor may be assumed collect substantially all dust, which is generated by the dust source (TOOL1). The filter FIL1 of the dust extractor 500 may separate and collect the dust from the air flow AIR1. The collected dust may form a dust layer on the filter FIL1. The increasing thickness of the dust layer may increase the total flow resistance of the filter FIL1 so that the air flow rate $Q_{AIR1}(t)$ is reduced with time.

In this comparative example, the motor of the dust extractor may be driven with the constant RMS voltage level, wherein the electric power of the motor decreases with decreasing air flow rate $Q_{AIR1}(t)$. The power needed for rotating the fan FAN1 at a given rotation speed may be proportional to the air flow rate and the pressure difference over the fan. Reducing the air flow rate $Q_{AIR1}(t)$ may reduce the power needed for rotating the fan FAN1, thereby reducing the electric power of the motor. When the motor is driven with constant voltage without using a control unit for controlling the rotation speed, then the motor may respond to the decreasing load by increasing the rotation speed even if the electric power of the motor is decreased.

In this comparative example, the maximum rotation speed $N_{RPM,MAX}$ of the motor would be attained in a situation where the air flow rate $Q_{AIR1}(t)$ would zero, e.g. if the hose would be completely blocked. In this comparative example, the minimum electric power of the motor would be attained in a situation where the air flow rate $Q_{AIR1}(t)$ would be zero.

The increasing thickness of the dust layer of the filter FIL1 may eventually cause that the air flow rate $Q_{AIR1}(t)$ decreases below an alarm limit value $Q_{MIN1}$ at a time $t_{20}$.

A partial blockage may happen between the times $t_5$, $t_7$. As the consequence, the flow rate $Q_{AIR1}(t)$ may be temporarily reduced between the times $t_5$, $t_7$.

The temporarily reduced flow rate $Q_{AIR1}(t)$ may temporarily reduce the load of the electric motor during the partial blockage between the times $t_5$, $t_7$. The electric motor may respond by temporarily increasing the rotation speed, when driven at the constant (RMS) voltage level (e.g. 230 V). However, the increased rotation speed is not sufficient to fully compensate the reduced air flow rate. Furthermore, the electric power and the electric current of the motor may be reduced during the partial blockage between the times $t_5$, $t_7$.

Figure 4B:
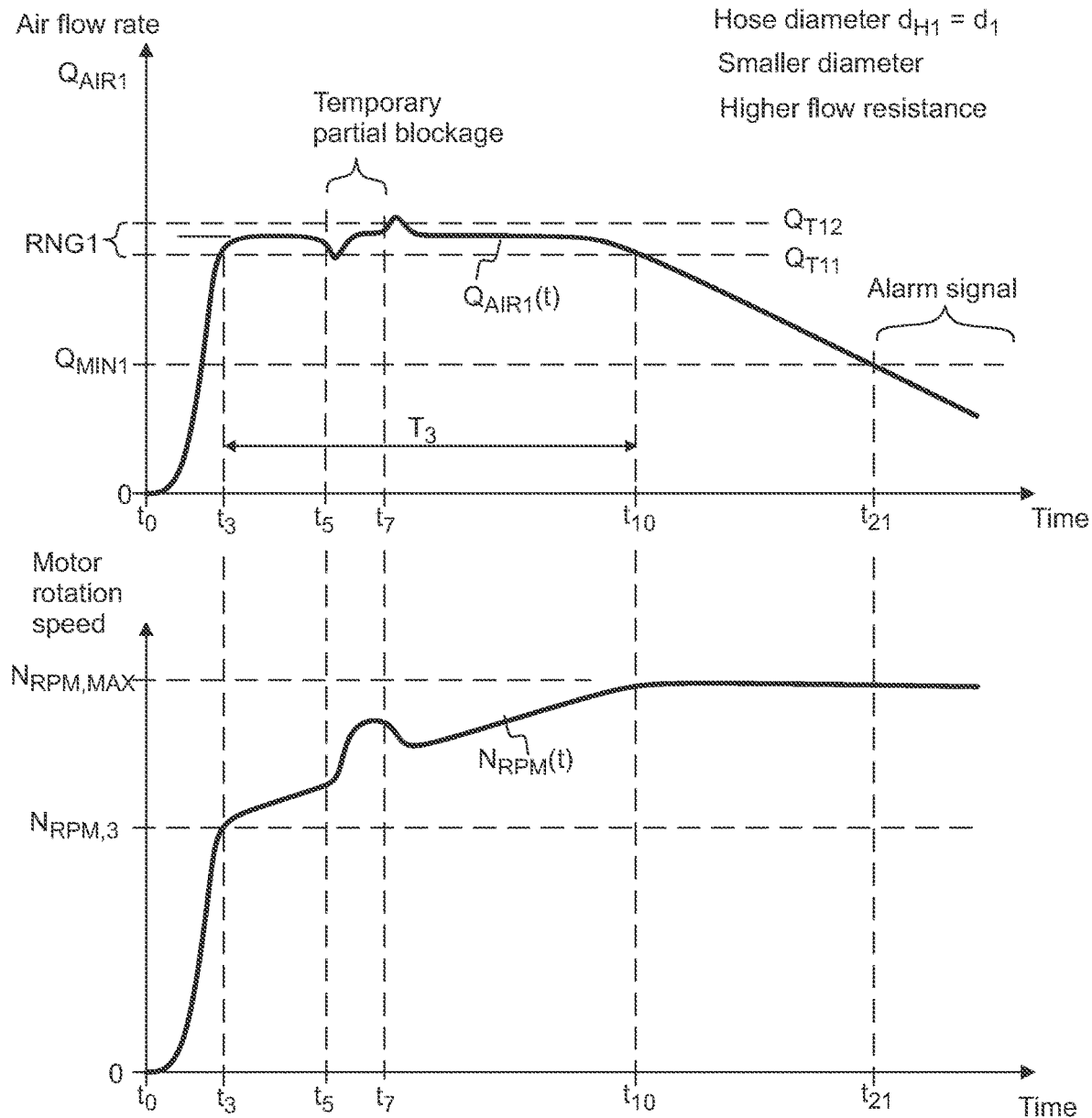
FIG. 4b shows, by way of example, temporal evolution of flow rate and temporal evolution of the rotation speed of motor, in a situation where the power of the motor is controlled to keep air flow rate within a first target range, wherein the hose has a first internal diameter.

FIG. 4b shows, by way of example, controlled operation of the dust extractor 500. The control unit CNT1 of the dust extractor 500 may adjust power $P_{500}$ and/or rotation speed $N_{RPM}(t)$ of the motor MOTOR1, so as to keep the air flow rate $Q_{AIR1}(t)$ within a predetermined target range RNG1. The target range RNG1 may have a lower limit $Q_{T11}$ and an upper limit $Q_{T12}$. The target flow rate $Q_{T1}$ may specify e.g. the lower limit $Q_{T11}$ of the range RNG1.

The motor may be started in the beginning (at time $t_0$). The control unit CNT1 may set the rotation speed $N_{RPM}(t)$ to a suitable value, e.g. $N_{RPM,3}$, such that the air flow rate $Q_{AIR1}(t)$ is within the predetermined range RNG1. The control unit CNT1 may set the rotation speed $N_{RPM}(t)$ to a suitable value, e.g. $N_{RPM,3}$, such that the air flow rate $Q_{AIR1}(t)$ is greater than or equal to the lower limit $Q_{T11}$. The rotation speed $N_{RPM}(t_3)$ may reach the (suitable) value $N_{RPM,3}$ at the time $t_3$, so that the air flow rate $Q_{AIR1}(t)$ may be within the predetermined range RNG1 at the time $t_3$. The rotation speed value $N_{RPM,3}$ of the motor MOTOR1 may be substantially smaller than the maximum value $N_{RPM,MAX}$.

The flow resistance of the filter FIL1 may increase e.g. at the same constant rate as in the comparative example of FIG. 4a. The control unit CNT1 of the dust extractor 500 may compensate the increasing flow resistance by increasing the rotation speed $N_{RPM}(t)$ of the motor MOTOR1, based on the measured air flow rate $Q_{AIR1}(t)$. The control unit CNT1 may adjust the electric power $P_{500}(t)$ and/or the rotation speed $N_{RPM}(t)$ so as to keep the measured air flow rate $Q_{AIR1}(t)$ higher than or equal to the lower limit $Q_{T11}$. The control unit CNT1 may adjust the electric power $P_{500}(t)$ and/or the rotation speed $N_{RPM}(t)$ so as to keep the measured air flow rate $Q_{AIR1}(t)$ within the predetermined range RNG1. The control unit CNT1 may increase the rotation speed $N_{RPM}(t)$ as the flow resistance increases, so as to keep the measured air flow rate $Q_{AIR1}(t)$ within the predetermined range RNG1.

The control unit CNT1 may increase the rotation speed $N_{RPM}(t)$ until the rotation speed $N_{RPM}(t)$ reaches the maximum value $N_{RPM,MAX}$ at the time $t_{10}$.

The air flow rate $Q_{AIR1}(t)$ may be kept within the predetermined range RNG1 during a time period $T_3$ between the times $t_3$ and $t_{10}$.

After the time $t_{10}$, the control unit CNT1 cannot any more compensate the increasing flow resistance by increasing the rotation speed $N_{RPM}(t)$.

After the time $t_{10}$, the measured air flow rate $Q_{AIR1}(t)$ begins to decrease e.g. due to the increasing flow resistance of the filter FIL1.

The measured air flow rate $Q_{AIR1}(t)$ may decrease below the alarm limit value $Q_{MIN1}$ at a time $t_{21}$. The control system SYS1 may be arranged to provide an alarm signal ALARM1 when the measured air flow rate $Q_{AIR1}(t)$ is lower than the alarm limit value $Q_{MIN1}$.

In order to further demonstrate the control, the partial blockage may happen between the times $t_5$, $t_7$. As the consequence, the control unit CNT1 may temporarily increase the power $P_{500}$ and/or rotation speed $N_{RPM}(t)$ so as to keep the measured air flow rate $Q_{AIR1}(t)$ higher than or equal to the minimum level $Q_{T11}$. The control unit CNT1 may temporarily increase the rotation speed $N_{RPM}(t)$ so as to keep the measured air flow rate $Q_{AIR1}(t)$ within the predetermined range RNG1. The control unit CNT1 may reduce the rotation speed $N_{RPM}(t)$ to a normal level after removal of the partial blockage. The motor MOTOR1 may have a finite response time to a change of the target speed of rotation. Consequently, the measured air flow rate $Q_{AIR1}(t)$ may have a small dip immediately after the time $t_5$ when the partial blockage happens. The measured air flow rate $Q_{AIR1}(t)$ may have a small peak immediately after the time $t_7$ when the partial blockage is removed.

Figure 4C:
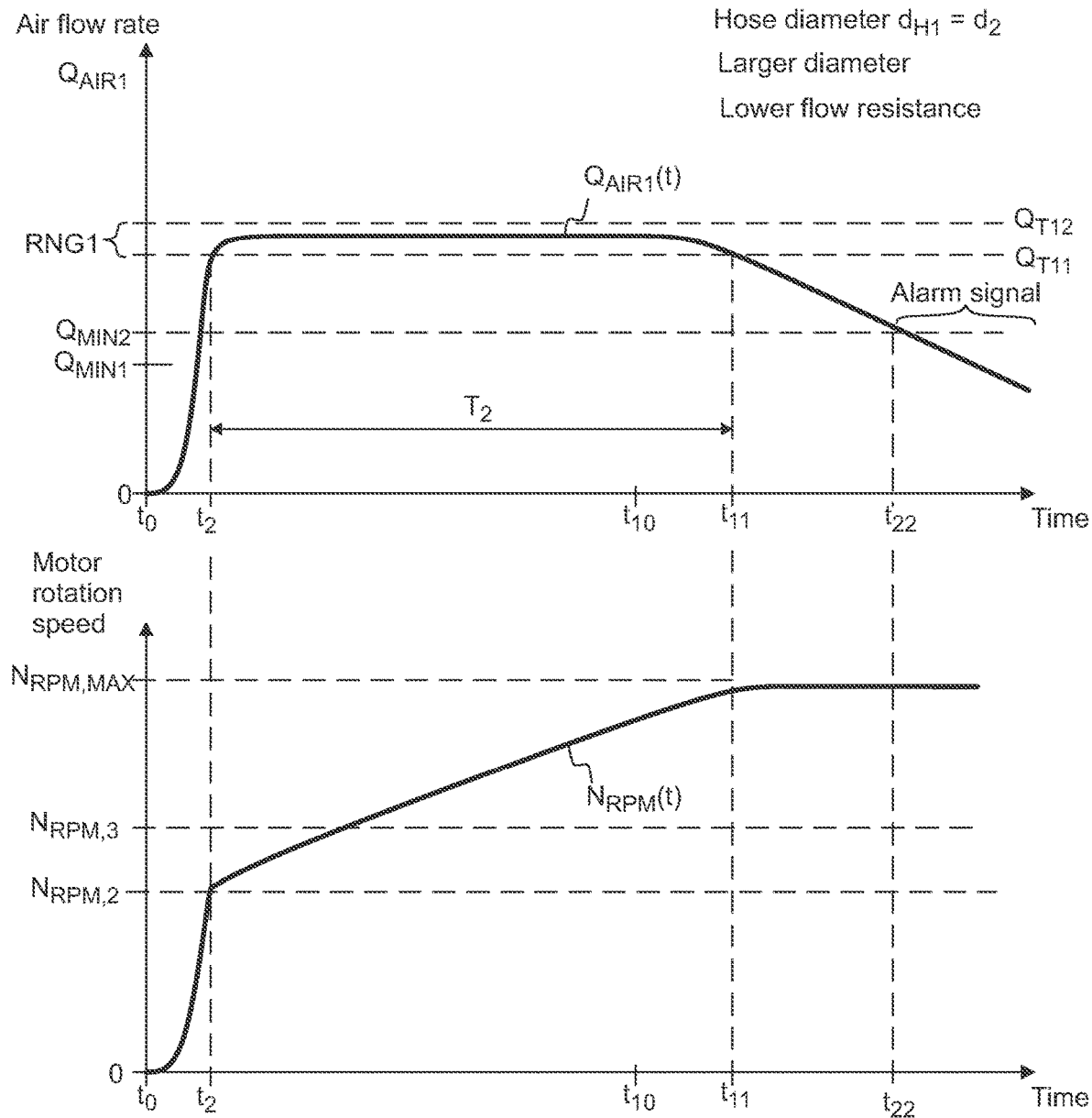
FIG. 4c shows, by way of example, temporal evolution of flow rate and temporal evolution of the rotation speed of motor, in a situation where the power of the motor is controlled to keep air flow rate within a first target range, wherein the hose has a second internal diameter.

FIG. 4c shows, by way of example, controlled operation of the dust extractor 500 in a situation where the inner diameter ($d_{H1}=d_2$) of the hose HOSE1 is larger than in case of FIG. 4b. The flow resistance of the hose may be smaller, which means that the air flow rate $Q_{AIR1}(t)$ may be kept within the predetermined range RNG1 by using a lower rotation speed ($N_{RPM,2}$), when compared with the case of FIG. 4b.

The motor MOTOR1 may be started in the beginning at the time $t_0$. The control unit CNT1 may set the rotation speed $N_{RPM}(t)$ to a suitable value, e.g. $N_{RPM,2}$, such that the air flow rate $Q_{AIR1}(t)$ is within the predetermined range RNG1. The rotation speed $N_{RPM}(t_2)$ at the time $t_2$ may be equal to $N_{RPM,2}$. The air flow rate $Q_{AIR1}(t)$ may be within the predetermined range RNG1 at the time $t_2$. The rotation speed value $N_{RPM,2}$ of the motor MOTOR1 may be smaller than the rotation speed value $N_{RPM,3}$ of FIG. 4b.

The control unit CNT1 may increase the rotation speed $N_{RPM}(t)$ as the flow resistance increases, so as to keep the measured air flow rate $Q_{AIR1}(t)$ within the predetermined range RNG1.

The control unit CNT1 may increase the rotation speed $N_{RPM}(t)$ until the rotation speed $N_{RPM}(t)$ reaches the maximum value $N_{RPM,MAX}$ at the time $t_{11}$.

The air flow rate $Q_{AIR1}(t)$ may be kept within the predetermined range RNG1 during a time period $T_2$, between the times $t_2$ and $t_{11}$.

The lower flow resistance of the hose HOSE1 may cause that the air flow rate $Q_{AIR1}(t)$ may be kept within the predetermined range RNG1 longer than in case of FIG. 4b.

After the time $t_{11}$, the measured air flow rate $Q_{AIR1}(t)$ begins to decrease e.g. due to the increasing flow resistance of the filter FIL1.

The measured air flow rate $Q_{AIR1}(t)$ may decrease below the alarm limit value $Q_{MIN2}$ at a time $t_{22}$. The control system SYS1 may be arranged to provide an alarm signal ALARM1 when the measured air flow rate $Q_{AIR1}(t)$ is lower than the alarm limit value $Q_{MIN2}$.

The hose diameter ($d_{H1}=d_2$) of FIG. 4c is greater than the hose diameter ($d_{H1}=d_1$) of FIG. 4b. The alarm value $Q_{MIN2}$ denotes the minimum air flow rate (L/s) needed to ensure the minimum air velocity (m/s) in case of the greater hose diameter ($d_{H1}=d_2$). The alarm value $Q_{MIN1}$ denotes the minimum air flow rate (L/s) needed to ensure the minimum air velocity (m/s) in case of the smaller hose diameter ($d_{H1}=d_1$). The value $Q_{MIN2}$ may be greater than the value $Q_{MIN1}$, due to the different inner diameter of the hoses HOSE1.

Figure 4D:
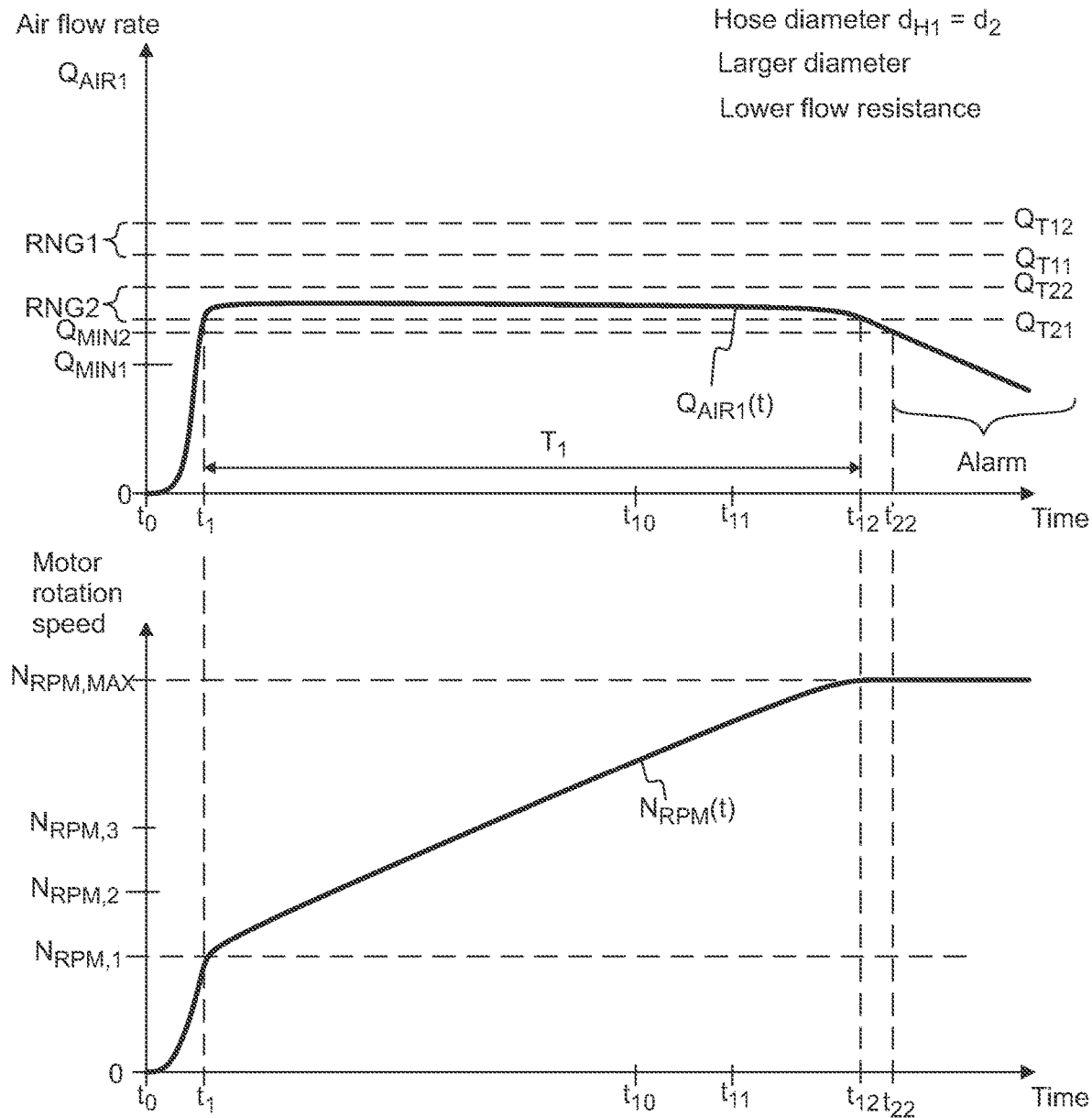
FIG. 4d shows, by way of example, temporal evolution of flow rate and temporal evolution of the rotation speed of motor, in a situation where the power of the motor is controlled to keep air flow rate within a second target range, wherein the hose has the second internal diameter.

FIG. 4d shows, by way of example, operation of the dust extractor 500 in a situation where the minimum target flow rate $Q_{T21}$ is lower than in case of FIG. 4c. The control unit CNT1 may keep the air flow rate $Q_{AIR1}(t)$ in a second range RNG2, which is different from the range RNG1. The target range RNG2 may have a lower limit $Q_{T21}$ and an upper limit $Q_{T22}$. The inner diameter of the hose HOSE1 may be the same ($d_{H1}=d_2$) as in case of FIG. 4c.

The motor MOTOR1 may be started in the beginning at the time $t_0$. The control unit CNT1 may set the rotation speed $N_{RPM}(t)$ to a suitable value, e.g. $N_{RPM,1}$, such that the air flow rate $Q_{AIR1}(t)$ is within the predetermined range RNG2. The rotation speed $N_{RPM}(t_1)$ at the time $t_1$ may be equal to $N_{RPM,1}$. The air flow rate $Q_{AIR1}(t)$ may be within the predetermined range RNG2 at the time $t_1$. The rotation speed value $N_{RPM,1}$ of the motor MOTOR1 may be smaller than the rotation speed value $N_{RPM,2}$ of FIG. 4c.

The control unit CNT1 may increase the rotation speed $N_{RPM}(t)$ as the flow resistance increases, so as to keep the measured air flow rate $Q_{AIR1}(t)$ within the predetermined range RNG2.

The control unit CNT1 may increase the rotation speed $N_{RPM}(t)$ until the rotation speed $N_{RPM}(t)$ reaches the maximum value $N_{RPM,MAX}$ at the time $t_{12}$.

The air flow rate $Q_{AIR1}(t)$ may be kept within the predetermined range RNG2 during a time period $T_1$, between the times $t_1$ and $t_{12}$.

The lower air flow rate may be maintained by using a weaker partial vacuum $p_1$. Consequently, the air flow rate $Q_{AIR1}(t)$ may be kept within the predetermined range RNG2 longer than in case of FIG. 4c.

After the time $t_{12}$, the measured air flow rate $Q_{AIR1}(t)$ begins to decrease e.g. due to the increasing flow resistance of the filter FIL1.

The measured air flow rate $Q_{AIR1}(t)$ may decrease below the alarm limit value $Q_{MIN2}$ at a time $t_{22}$. The control system SYS1 may be arranged to provide an alarm signal ALARM1 when the measured air flow rate $Q_{AIR1}(t)$ is lower than the alarm limit value $Q_{MIN2}$.

Figure 5:
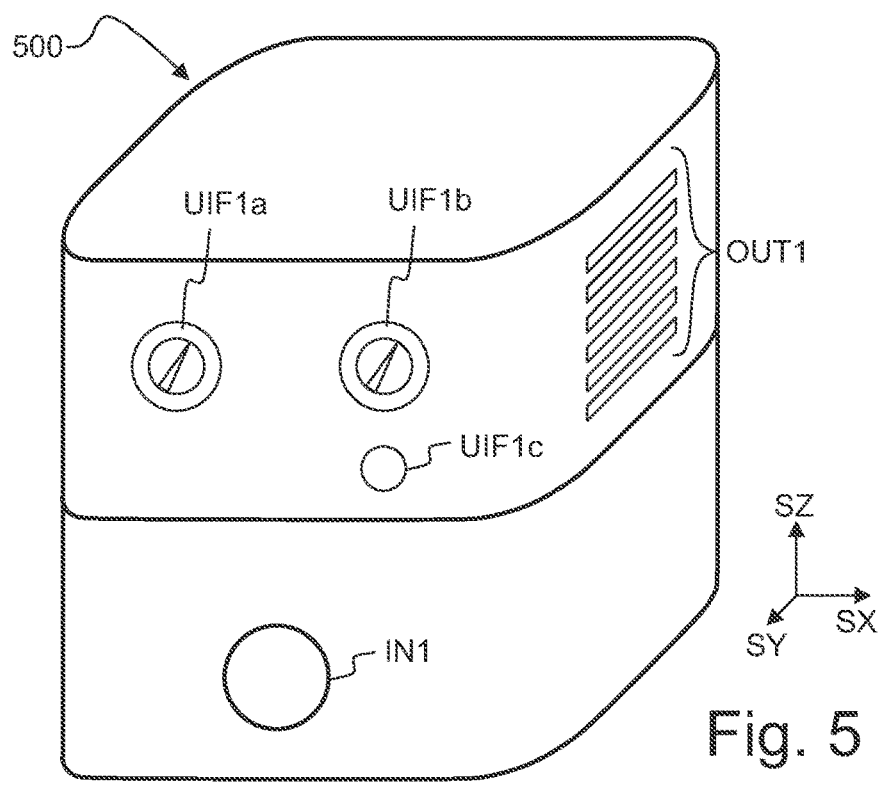
FIG. 5 shows, by way of example, in a three-dimensional view, a dust extractor.

FIG. 5 shows, by way of example, in a three-dimensional view, a dust extractor 500.

The dust extractor 500 may comprise one or more input devices UIF1a, UIF1b for inputting a target power setting $P_{T1}$ and/or the hose diameter $d_{H1}$ to the control system SYS1. The dust extractor 500 may comprise an input device UIF1a for inputting a target power setting $P_{T1}$. The dust extractor 500 may comprise an input device UIF1b for inputting a hose diameter $d_{H1}$.

The dust extractor 500 may comprise one or more output devices UIF1c e.g. for providing an audible and/or visual alarm signal ALARM1. The output device UIF1c may comprise e.g. buzzer or a loudspeaker for providing an audible alarm signal. The output device UIF1c may comprise e.g. a lamp for providing a visual alarm signal.

SX, SY, and SZ denote orthogonal directions.

Figure 6:
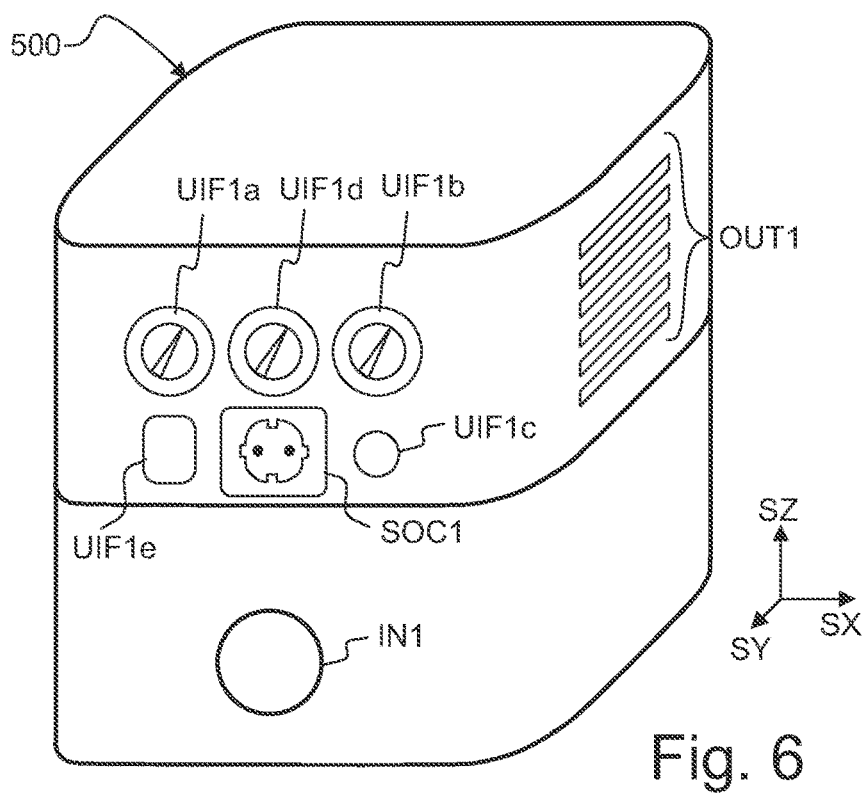
FIG. 6 shows, by way of example, in a three-dimensional view, a dust extractor.

Referring to FIG. 6, the dust extractor 500 may optionally comprise e.g. an electric socket SOC1 for distributing electric power e.g. for the power tool TOOL1. The dust extractor 500 may comprise an input device UIF1d for setting an operating mode of the dust extractor 500. For example, the dust extractor 500 may have a first operating mode where the dust extractor 500 operates continuously, and the dust extractor 500 may have a second operating mode where the dust extractor 500 operates only when electric power is drawn from the socket SOC1. The socket SOC1 may also be called as an electric connector.

The dust extractor 500 may optionally comprise an input device UIF1e for starting a filter cleaning sequence. The filter cleaning sequence may comprise e.g. applying a reverse air pulse and/or shaking the filter FIL1. The dust extractor 500 may be arranged to clean the filter FIL1 e.g. by using a reverse air pulse and/or by shaking the filter FIL1. The control system SYS1 may be configured to start a reverse air pulse and/or shaking of the filter based on an input received via the input device UIF1e. The input device UIF1e may comprise e.g. a push button. The human user may manually push the button so as to start a filter cleaning sequence.

The dust extractor 500 has an inlet IN1 for connecting with the dust hose HOSE1. The dust extractor 500 may have an outlet OUT1 for discharging the substantially particle-free air flow AIR1 into ambient air, after the dust particles DUST1 have been separated from the air flow AIR1.

The input device UIF1a, UIF1b, UIF1d, and/or UIF1e may be implemented e.g. by a rotary handle, by a sliding handle, and/or by one or push buttons.

Figure 7A:
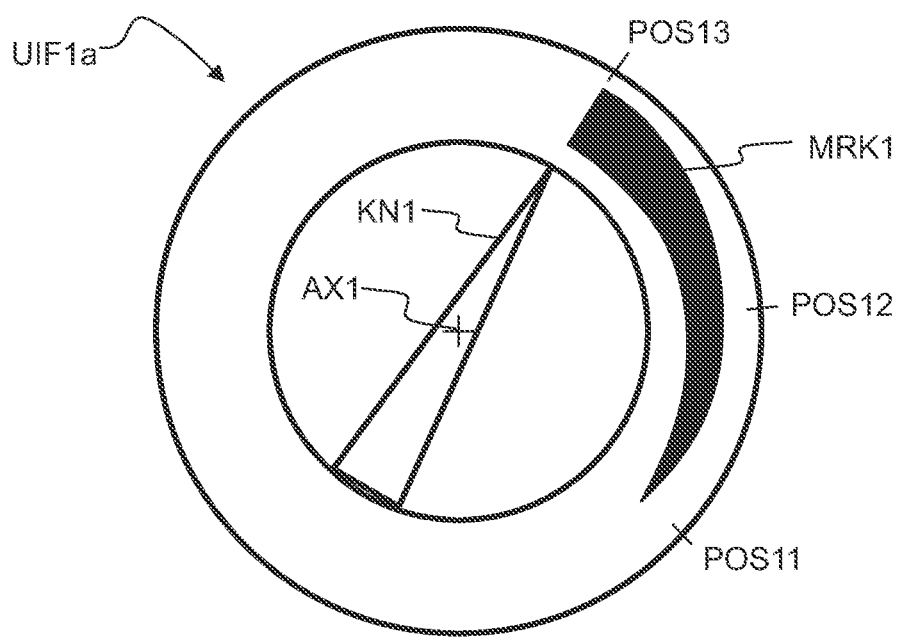
FIG. 7a shows, by way of example, in a front view, a manual selector for inputting a target power setting.

FIG. 7a shows, by way of example, an input device UIF1a for inputting a target air flow rate $Q_{T1}$ to the control system SYS1. The input device UIF1a may comprise e.g. a movable handle KN1. The input device UIF1a may comprise e.g. a rotary handle KN1, which may rotated about an axis AX1. A human user may manually move the handle KN2 so as to select a target flow rate $Q_{T1}$.

Each position of the handle KN1 may correspond to a (different) nominal target power level $P_{T1}$, which in turn may correspond to a (different) target air flow rate $Q_{T1}$. The input device UIF1a may comprise one or more visual indicators MRK1, which may visually associate the different positions of the handle KN1 with different power level values.

For example, the handle KN1 may be moved to a first position POS11 to select a minimum target power level $P_{T1}$. For example, the handle KN1 may be moved to a second position POS12 to select a medium target power level. For example, the handle KN1 may be moved to a third position POS13 to select a maximum target power level.

The input device UIF1a may provide the selected target power level $P_{T1}$ as an input to the control system SYS1.

Each position of the handle KN1 may correspond to a different target air flow rate $Q_{T1}$, which in turn may correspond to a different nominal target power level $P_{T1}$ of the motor. For example, the handle KN1 may be moved to a first position POS11 to select a minimum target air flow rate. For example, the handle KN1 may be moved to a second position POS12 to select a medium target air flow rate. For example, the handle KN1 may be moved to a second position POS13 to select a maximum target air flow rate. The input device UIF1a may provide the selected target air flow rate as an input to the control system SYS1. Each different target air flow rate $Q_{T1}$ may correspond to a different target power level $P_{T1}$ of the motor e.g. in a situation where the dust separator FIL1 is clean, and the unobstructed suction hose HOSE1 has a nominal size (e.g. $d_{H1}=d_1$).

Figure 7B:
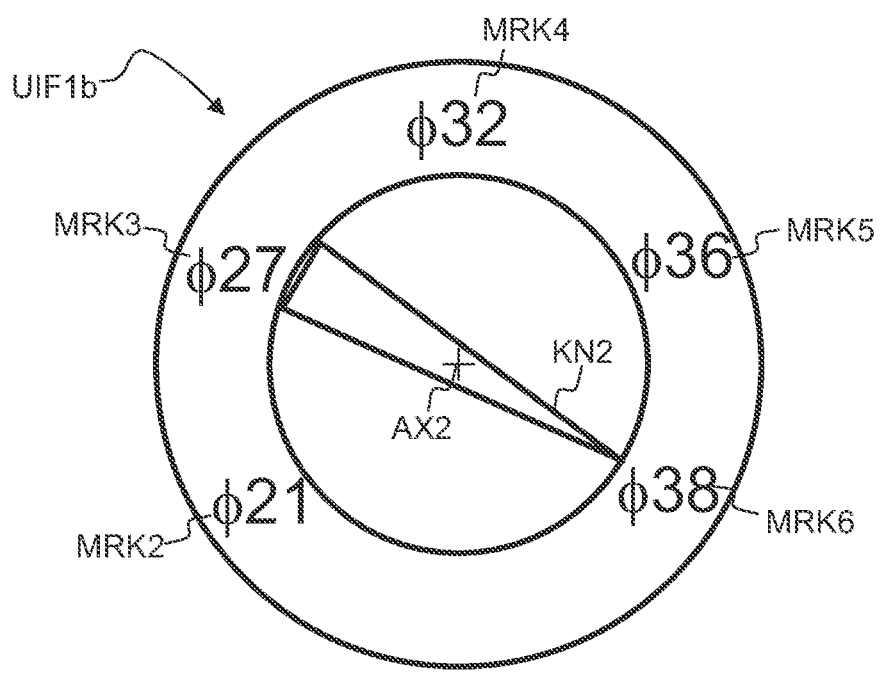
FIG. 7b shows, by way of example, in a front view, a manual selector for inputting a hose diameter value.

FIG. 7b shows, by way of example, an input device UIF1b for inputting a hose diameter value $h_{H1}$ to the control system SYS1. The input device UIF1b may comprise e.g. a rotary handle KN2, which may rotated about an axis AX2. A human user may manually move the handle KN2 so as to select a hose diameter value $h_{H1}$ from a plurality of selectable values (e.g. 21 mm, 27 mm, 32 mm, 36 mm, 37 mm). The user may move the handle KN2 so that the input device UIF1b indicates a hose diameter value $h_{H1}$, wherein the input device UIF1b may provide said hose diameter value $h_{H1}$ as an input to the control system SYS1. The indicated hose diameter value $h_{H1}$ may be selected to correspond to the actual diameter of the hose HOSE1 connected to the dust extractor 500. The input device UIF1a may comprise e.g. a plurality of visual markings MRK2, MRK3, MRK4, MRK5, MRK6 to indicate the selectable diameter values (e.g. 21 mm, 27 mm, 32 mm, 36 mm, 38 mm).

In an embodiment, the dust extractor may comprise e.g. a keypad or a touch screen for receiving user input. In an embodiment, the user interface UIF1 (UIF1a, UIF1b, UIF1c, UIF1d, UIF1e) may also be implemented e.g. by an application running on a mobile phone. The (mobile) user interface UIF1 may communicate with the dust extractor 500 e.g. via wireless communication.

Figure 8:
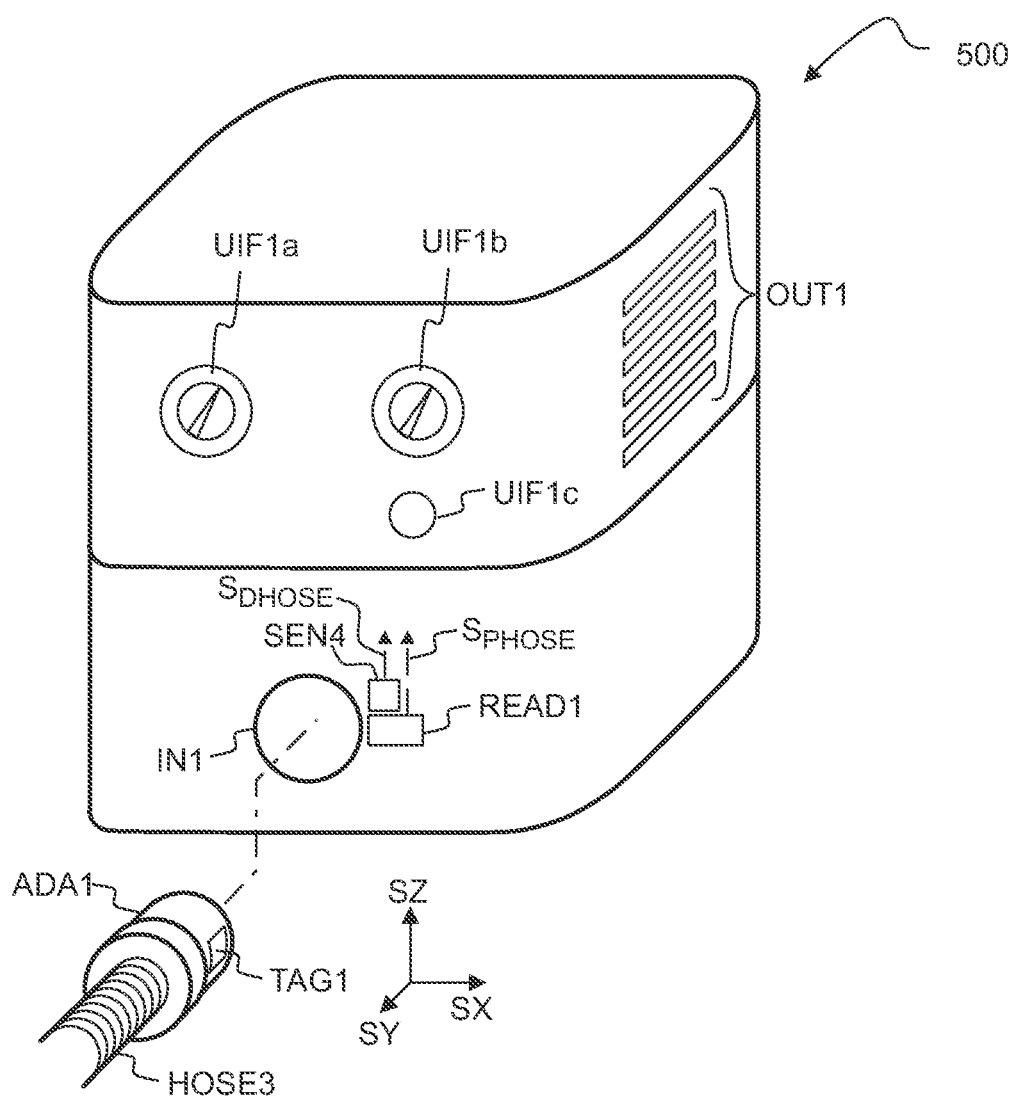
FIG. 8 shows, by way of example, in a three-dimensional view, a dust extractor and a hose, wherein the dust extractor comprises a reader to read a hose diameter value from a data carrier of the hose.

Referring to FIG. 8, the dust extractor device 500 may optionally comprise a reader READ1 to read a hose diameter value $d_{H1}$ from a data carrier TAG1 of a hose HOSE3, in an instance where a hose HOSE3 comprising the data carrier TAG1 is connected to the inlet IN1 of the device 500. The reader READ1 may provide a hose size signal ($S_{DHOSE}$), which is indicative of the hose diameter value $d_{H1}$ obtained from the data carrier TAG1. The control system SYS1 may use the obtained hose diameter value $d_{H1}$ as an input for controlling operation of the device 500. The control system SYS1 of the device 500 may be arranged to determine the limit value $Q_{MIN1}$ of the air flow rate from the hose diameter value $d_{H1}$.

The data carrier TAG1 may comprise machine readable data indicative of the hose diameter value $d_{H1}$ of the hose HOSE3. The data carrier TAG1 may e.g. an RFID tag, and the reader READ1 may be an RFID reader. RFID means radio frequency identification. The data carrier TAG1 may e.g. an NFC tag, and the reader READ1 may be an NFC reader. NFC means near field communication. The data carrier TAG1 may comprise e.g. an optically readable code, and the reader READ1 may be an optical reader. The data carrier TAG1 may comprise e.g. a magnetically readable code, and the reader READ1 may be suitable for reading the magnetically readable code.

Figure 9:
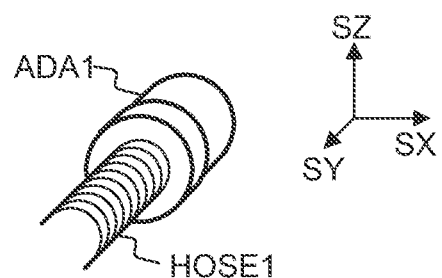
FIG. 9 shows, by way of example, a hose without a data carrier.

Referring to FIG. 9, a hose HOSE1 may also be provided such that the hose HOSE1 does not comprise a data carrier TAG1, or the data carrier TAG1 of the HOSE1 does not comprise machine-readable data indicative of the hose diameter value of the hose HOSE1.

One or more hoses (HOSE3) may comprise a data carrier TAG1, wherein one or more hoses (HOSE1) do not comprise a data carrier TAG1. A first hose (HOSE1) without the data carrier TAG1 may be connectable to the dust extractor device 500, and also a second hose (HOSE3) with a data carrier TAG1 may be connectable to the dust extractor device 500. The dust extractor device 500 may be compatible with a hose regardless of whether the hose has a data carrier or not. The control system SYS1 may be arranged to ensure proper operation of the device 500 with both types of hoses.

The dust extractor device 500 may optionally comprise a presence sensor SEN4 to detect whether a hose (e.g. HOSE1 or HOSE3) is connected to the inlet IN1 or not. The presence sensor SEN4 may provide a presence signal ($S_{DHOSE}$), which indicates whether a hose (e.g. HOSE1 or HOSE3) is connected to the inlet IN1 or not. The control system SYS1 may determine based on the presence signal ($S_{DHOSE}$) whether a hose is connected to the inlet IN1 or not. The sensor SEN4 may be e.g. mechanical sensor or optical sensor to detect whether a hose (e.g. HOSE1 or HOSE3) is connected to the inlet IN1 or not, after a previous hose has been disconnected. The sensor SEN4 may comprise e.g. a microswitch, which is actuated when a hose is connected or disconnected.

In an embodiment, the control system SYS1 of the device 500 may be arranged to require inputting or confirming the hose diameter value $d_{H1}$ via the user interface UIF1b in an instance where the sensor SEN4 indicates that a hose is connected to the inlet IN1, but machine-readable data indicative of the hose diameter value cannot be read via the reader READ1.

For example, the control system SYS1 of the device 500 may be arranged to provide a visual indication and/or an audio indication that the user needs to input or confirm the hose diameter value after connecting a hose, e.g. by manually operating the user interface UIF1b. For example, the user interface UIF1 may comprise an output device (e.g. UIF1c) for providing a visual indication and/or an audio indication that the user needs to input or confirm the hose diameter value. The control system SYS1 may be arranged to continue providing the visual indication and/or the audio indication until the control system SYS1 detects that user input is provided via the user interface (e.g. UIF1b). The control system SYS1 may be arranged to continue providing the visual indication and/or the audio indication until the hose diameter value has been inputted or confirmed.

The control system SYS1 may be arranged to determine the limit value $Q_{MIN1}$ of the air flow rate from the hose diameter value $d_{H1}$, in an instance where data indicative of the hose diameter value $d_{H1}$ can be read from the data carrier TAG1 of the hose, by using the reader READ1.

In an embodiment, the control system SYS1 may determine the limit value $Q_{MIN1}$ from a hose diameter value $d_{H1}$ obtained via the reader READ1, instead of a hose diameter value $d_{H1}$ obtained via the user interface (UIF1b), in an instance where the hose diameter value $d_{H1}$ obtained via the reader READ1 is available. The machine-readable data read via the reader READ1 may override manually inputted data. The control system SYS1 may give a higher priority for the hose diameter value $d_{H1}$ obtained via the reader READ1. The control system SYS1 may be arranged to ignore a hose diameter value inputted via the user interface UIF1b if machine-readable data indicative of the hose diameter value is obtained via the reader READ1. The control system SYS1 may be arranged to disable indication that the user needs to confirm the hose diameter value, if the machine-readable data is obtained via the reader READ1.

In an embodiment, the flow measuring unit FSEN1 may also be implemented e.g. by guiding the flow AIR1 via a constriction, by measuring an upstream pressure and a downstream pressure of a constriction, and by determining the flow rate from the upstream pressure and the downstream pressure. In an embodiment, the flow measuring unit FSEN1 may also be implemented e.g. by using a miniature anemometer for measuring the velocity at the outlet OUT1.

Figure 10A:
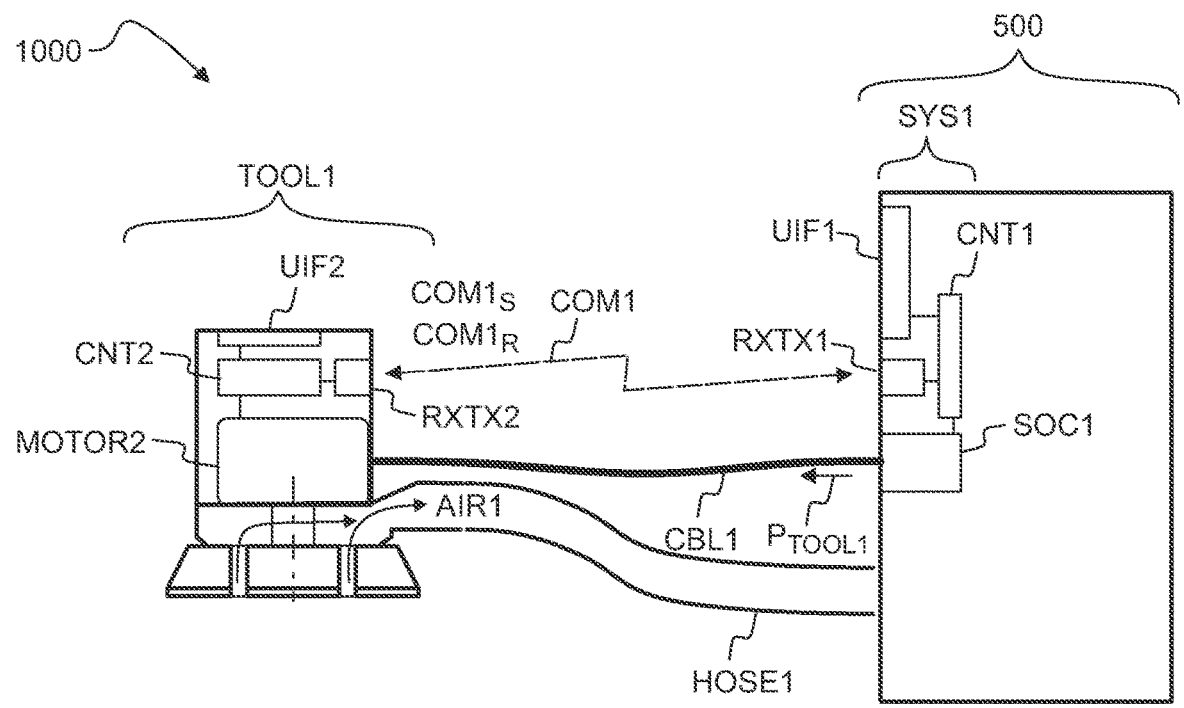
FIG. 10a shows, by way of example, a surface processing apparatus, which has communication capabilities.

Referring to FIG. 10a, the dust extractor 500 may comprise an electrical connector SOC1 and/or a communication unit RXTX1 for controlling operation of the power tool TOOL1. The apparatus 1000 may have an operating mode where the power tool TOOL1 is caused to stop generating dust, in a situation where the air flow rate $Q_{AIR1}$ cannot be maintained higher than or equal to a predetermined lower limit ($Q_{T11}$ or $Q_{MIN1}$). Said operating mode may be called e.g. as enhanced safety mode or forced stopping mode. Said operating mode may be user-selectable. Said operating mode may be enabled and disabled e.g. by using the user interface UIF1 of the dust extractor 500.

The apparatus 1000 may sometimes be operated in such a noisy environment that the user may fail to notice an alarm signal. The user may sometimes be so focused on his work that he fails to notice an alarm signal. Automatic control of the power of the power tool TOOL1 may improve operating safety, by stopping production of dust DUST1 in a situation where safe air flow speed cannot be maintained. The automatic control of the power of the power tool TOOL1 may be an additional safety feature to protect the user from hazardous dust.

In an embodiment, the operating power of the power tool TOOL1 may be reduced in a situation where the air flow rate $Q_{AIR1}$ cannot be maintained higher than or equal to a predetermined limit ($Q_{T11}$ or $Q_{MIN1}$). Reducing the power of the power tool TOOL1 is likely to catch attention of the user. Reducing the power of the power tool TOOL1 may improve detectability of the alarm signal (ALARM1).

The control system SYS1 may cause the power tool TOOL1 to stop generating dust in a situation where the air flow rate ($Q_{AIR1}$) cannot be maintained higher than or equal to an alarm limit value ($Q_{MIN1}$). The control system SYS1 may e.g. stop operation of the motor MOTOR2 of the power tool TOOL1. In particular, if the dust extractor can't achieve at least the minimum required flow velocity ($v_{min1}$), then the control system SYS1 may cause the power tool TOOL1 to stop generating dust. Consequently, production of the dust may be stopped, and there is no more dust being piled up in the hose HOSE1.

After the control system SYS1 has caused the power tool TOOL1 to stop generating dust, the control system SYS1 may optionally stop also the operation of the motor (MOTOR1) of the dust extractor 500.

The dust extractor 500 may comprise an electrical connector SOC1 for supplying electrical power to a power tool TOOL1, wherein the control system SYS1 may reduce or switch off electrical power $P_{TOOL1}$ transferred via the electrical connector SOC1 in a situation where the air flow rate $Q_{AIR1}$ cannot be maintained higher than or equal to a predetermined lower limit ($Q_{T11}$ or $Q_{MIN1}$). The control system SYS1 may reduce or switch off the electrical power $P_{TOOL1}$ in a situation where the air flow rate $Q_{AIR1}$ is smaller than the predetermined lower limit ($Q_{T11}$ or $Q_{MIN1}$). The control system SYS1 may be arranged to reduce or stop transfer of electrical power ($P_{TOOL1}$) via the electrical connector SOC1 to the power tool TOOL1. For example, a relay may be used to disable power to the socket SOC1. The electrical power $P_{TOOL1}$ may be transferred from the connector SOC1 to the power tool TOOL1 e.g. via a cable CBL1.

The dust extractor 500 may comprise a communication unit RXTX1 for transmitting a control signal COM1 to a power tool TOOL1. The control system SYS1 may transmit a stopping instruction ($COM1_S$) or a reducing instruction ($COM1_R$) via the communication unit (RXTX1) in a situation where the air flow rate ($Q_{AIR1}$) cannot be maintained higher than or equal to a predetermined lower limit ($Q_{T11}$ Or $Q_{MIN1}$). The control system SYS1 may transmit a stopping instruction ($COM1_S$) or a reducing instruction ($COM1_R$) in a situation where the air flow rate ($Q_{AIR1}$) is smaller than the predetermined lower limit ($Q_{T11}$ or $Q_{MIN1}$). The stopping instruction ($COM1_S$) may be an instruction for causing the power tool to stop generating dust. The reducing instruction ($COM1_R$) may be an instruction for reducing power of the power tool. For example, the power tool TOOL1 may be arranged to stop generating dust according to a stopping instruction ($COM1_S$) received from the control system SYS1. For example, transmitting the stopping instruction ($COM1_S$) to the power tool TOOL1 may cause the control unit CNT2 of the power tool TOOL1 to set the power tool TOOL1 to a standby operating mode. For example, transmitting the stopping instruction ($COM1_S$) to the power tool TOOL1 may cause the control unit CNT2 to disconnect the motor MOTOR2 from a power source (e.g. from a battery, from a mains network (MAINS1), or from the electrical connector (SOC1).

The power tool TOOL1 may comprise a communication unit RXTX2 for receiving instructions ($COM1_S$, $COM1_R$) from the dust extractor 500. For example, the power tool TOOL1 may be arranged to stop operation of the motor MOTOR2 according to a stopping instruction ($COM1_S$) received via the communication units RXTX1, RXTX2. The power tool TOOL1 may comprise a control unit CNT2 for controlling operation of the power tool TOOL1. The control unit CNT2 may control the operation e.g. based on instructions ($COM1_S$, $COM1_R$) and/or based on user input received from the user. The instructions may also be called as commands.

The communication units RXTX1, RXTX2 may communicate with each other directly and/or via one or more auxiliary devices. The communication units RXTX1, RXTX2 may communicate by wired and/or wireless communication. The communication units RXTX1, RXTX2 may communicate e.g. via Bluetooth, wireless local area network, and/or wireless mobile communications network.

The power tool TOOL1 may also comprise a user interface UIF2 for receiving user input from the user and/or for providing information to the user UIF2.

For example, the user interface UIF1 and/or UIF2 may be arranged to provide an alarm signal (ALARM1) to the user if the measured air flow rate $Q_{AIR1}$ is smaller than the alarm limit value ($Q_{MIN1}$).

In an embodiment, the user interface UIF1 and/or UIF2 may be arranged to suggest emptying the dust extractor 500 when needed. The user interface UIF1 and/or UIF2 may be arranged to suggest replacing a dust bag and/or a dust filter FIL1 when needed.

Figure 10B:
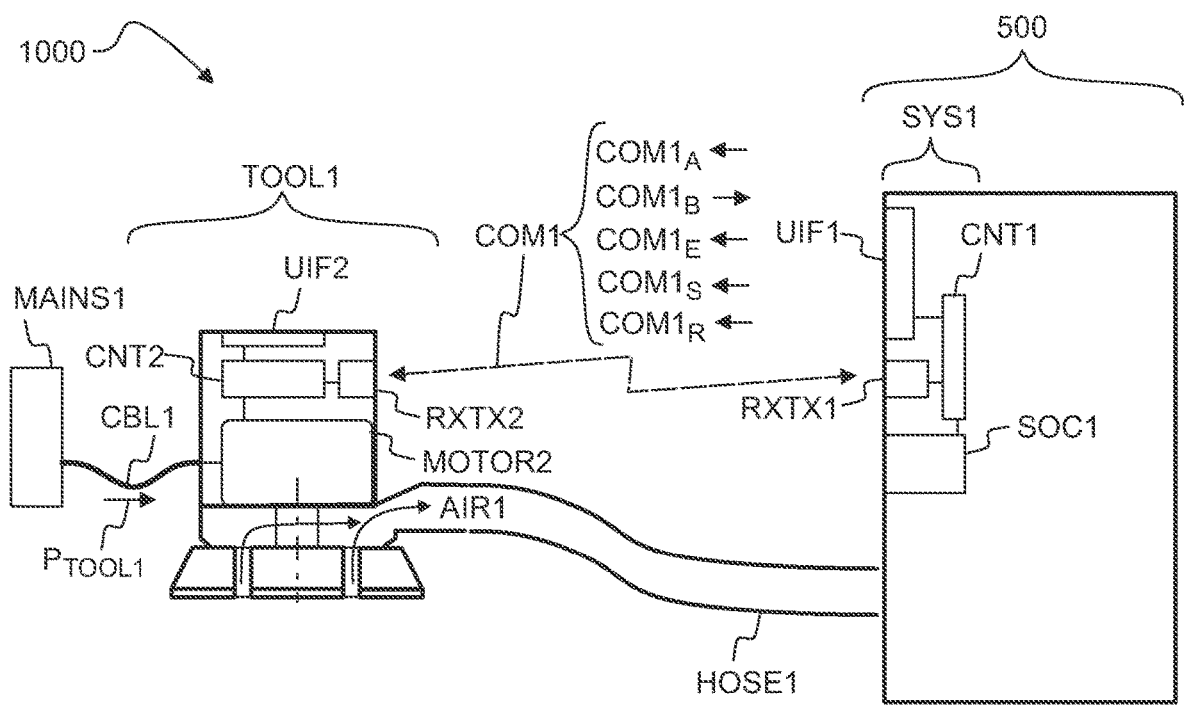
FIG. 10b shows, by way of example, a surface processing apparatus, which has communication capabilities.

Referring to FIG. 10b, the control system SYS1 may optionally check whether the power tool TOOL1 has a capability to receive and execute instructions (COM1$_S$, COM1$_R$) transmitted by the control system SYS1 or not. Operating the apparatus 1000 may comprise performing a handshake procedure between the control system SYS1 and the power tool TOOL1. The method may comprise transmitting handshake signals COM1$_A$, COM1$_B$, COM1$_E$. In an embodiment, the operation of the power tool TOOL1 may be enabled only if the handshake signals COM1$_A$, COM1$_B$, COM1$_E$ are successfully transmitted and received.

The control system SYS1 may send an interrogation signal COM1$_A$ to the power tool TOOL1. The power tool TOOL1 may respond to the interrogation signal COM1$_A$ by sending a valid response signal COM1$_B$, which indicates that the power tool TOOL1 has a capability to receive and execute instructions (COM1$_S$, COM1$_R$) transmitted by the control system SYS1. Alternatively, the power tool TOOL1 may respond to the interrogation signal COM1$_A$ by sending a wrong response or by not responding at all. The control system SYS1 may be arranged to enable operation of the power tool TOOL1 only if the control system SYS1 receives the valid response signal COM1$_B$ from the power tool in response to the interrogation signal COM1$_A$. The control system SYS1 may enable operation of the power tool TOOL1 e.g. by sending an enabling instruction COM1$_E$ to the power tool TOOL1, after receiving the valid response signal COM1$_B$. The power tool TOOL1 may be arranged to enable operation of the power tool TOOL1 only after receiving and executing the enabling instruction COM1$_E$. The power tool TOOL1, and in particular the motor MOTOR2 may receive operating power P$_{TOOL1}$ from a power source (e.g. from a battery, from a mains network (MAINS1), or from the electrical connector (SOC1).

The control system SYS1 may be arranged to provide an alarm or a warning in a situation where the control system SYS1 does not receive a valid response signal COM1$_B$ in response to the interrogation signal COM1$_A$. The control system SYS1 may provide the alarm or the warning e.g. via the user interface UIF1.

In an embodiment, the apparatus 1000 may have the forced stopping operating mode also in a situation where the dust extractor device of the apparatus is not arranged to automatically control power based on measured air flow rate. In an embodiment, the apparatus may have the forced stopping operating mode also in a situation where the dust extractor device does not have the capability to automatically control power based on measured air flow rate.

For the person skilled in the art, it will be clear that modifications and variations of the systems, products, apparatuses, devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. A dust extractor device, comprising:
   a fan for causing an air flow,
   a motor to rotate the fan,
   a dust separator to separate dust particles from the air flow,
   a flow measuring unit for measuring air flow rate of the air flow, and
   a control unit configured to adjust electric power of the motor based on the measured air flow rate, and
   a user interface for inputting a hose diameter value,
   wherein the flow measuring unit comprises a rotation speed indicator unit to provide a rotation speed signal indicative of the rotation speed of the fan, and one or more pressure sensors to measure a pressure difference over the fan, wherein a control system of the device is arranged to measure the air flow rate by calculating the air flow rate from the pressure difference and from the rotation speed of the fan,
   wherein the control system of the device is arranged to compare the measured air flow rate with an alarm limit value, wherein the control system is arranged to provide an alarm signal if the measured air flow rate is smaller than the alarm limit value, wherein the control system of the device is arranged to determine the alarm limit value from the hose diameter value.

2. The device of claim 1, wherein the control system of the device is arranged to provide a flow rate signal indicative of the measured air flow rate, wherein the control unit is configured to adjust the electric power of the motor based on the flow rate signal.

3. The device of claim 2, wherein the control unit is arranged to keep the air flow rate higher than a predetermined lower limit by adjusting the rotation speed of the motor based on the flow rate signal.

4. The device of claim 1, further comprising a user interface for inputting a target power value, wherein the control unit is arranged to adjust the rotation speed of the motor based on the measured air flow rate so as to keep the measured air flow rate substantially equal to a target flow rate, which corresponds to the target power value.

5. The device of claim 4, wherein the control unit is arranged to adjust the rotation speed of the motor based on the measured air flow rate so as to keep the difference between the target flow rate and the measured air flow rate smaller than 10% of the target flow rate.

6. The device of claim 1, wherein the control unit is arranged to keep the air flow rate within a predetermined target flow rate range by adjusting the rotation speed of the motor based on the measured air flow rate.

7. The device of claim 1, comprising a user interface for inputting a target power value, wherein the control unit is arranged to adjust the rotation speed of the motor based on the measured air flow rate so as to keep the measured air flow rate within a target flow rate range, which corresponds to the target power value.

8. The device of claim 1, comprising an electrical connector for supplying electrical power to a power tool, wherein the control system of the device is arranged to reduce or switch off electrical power transferred via the electrical connector in a situation where the measured air flow rate is smaller than the alarm limit value.

9. The device of claim 1, comprising a communication unit for transmitting a control signal to a power tool, wherein the control system of the device is arranged to transmit a stopping instruction and/or a reducing instruction via the communication unit in a situation where the measured air flow rate is smaller than the alarm limit value, wherein the stopping instruction is an instruction for causing the power tool to stop generating dust particles, and wherein the reducing instruction is an instruction for reducing power of the power tool.

10. A dust extractor device, comprising:
a fan for causing an air flow,
a motor to rotate the fan,
a dust separator to separate dust particles from the air flow,
a flow measuring unit for measuring air flow rate of the air flow,
a control unit configured to adjust electric power of the motor based on the measured air flow rate, and
a reader to read machine-readable data indicative of a hose diameter value from a data carrier of a hose, in an instance where the hose comprising the data carrier is connected to an inlet of the device,
wherein the flow measuring unit comprises a rotation speed indicator unit to provide a rotation speed signal indicative of the rotation speed of the fan, and one or more pressure sensors to measure a pressure difference over the fan, wherein a control system of the device is arranged to measure the air flow rate by calculating the air flow rate from the pressure difference and from the rotation speed of the fan,
wherein the control system of the device is arranged to compare the measured air flow rate with an alarm limit value, wherein the control system is arranged to provide an alarm signal if the measured air flow rate is smaller than the alarm limit value, wherein the control system of the device is arranged to determine the limit value from the hose diameter value obtained via the reader.

11. An apparatus for extracting dust, the apparatus comprising:
a dust extractor device, and
a hose for conveying an air flow and dust particles to the dust extractor device, the hose comprising a data carrier,
wherein the dust extractor device comprises:
a fan for causing an air flow,
a motor to rotate the fan,
a dust separator to separate dust particles from the air flow,
a flow measuring unit for measuring air flow rate of the air flow,
a control unit configured to adjust electric power of the motor based on the measured air flow rate, and
a reader to read machine-readable data indicative of a hose diameter value from the data carrier of the hose, in an instance where the hose is connected to an inlet of the device,
wherein the flow measuring unit comprises a rotation speed indicator unit to provide a rotation speed signal indicative of the rotation speed of the fan, and one or more pressure sensors to measure a pressure difference over the fan, wherein a control system of the device is arranged to measure the air flow rate by calculating the air flow rate from the pressure difference and from the rotation speed of the fan,
wherein the control system of the device is arranged to compare the measured air flow rate with an alarm limit value, wherein the control system is arranged to provide an alarm signal if the measured air flow rate is smaller than the alarm limit value, wherein the control system of the device is arranged to determine the limit value from the hose diameter value obtained via the reader.

12. A dust extractor device, comprising:
a fan for causing an air flow,
a motor to rotate the fan,
a dust separator to separate dust particles from the air flow,
a flow measuring unit for measuring air flow rate of the air flow,
a control unit configured to adjust electric power of the motor based on the measured air flow rate, and
an electrical connector for supplying electrical power to a power tool,
wherein the flow measuring unit comprises a rotation speed indicator unit to provide a rotation speed signal indicative of the rotation speed of the fan, and one or more pressure sensors to measure a pressure difference over the fan, wherein a control system of the device is arranged to measure the air flow rate by calculating the air flow rate from the pressure difference and from the rotation speed of the fan,
wherein the control system of the device is arranged to reduce or switch off electrical power transferred via the electrical connector in a situation where the measured air flow rate is smaller than an alarm limit value.

13. A dust extractor device, comprising:
a fan for causing an air flow,
a motor to rotate the fan,
a dust separator to separate dust particles from the air flow,
a flow measuring unit for measuring air flow rate of the air flow, and
a control unit configured to adjust electric power of the motor based on the measured air flow rate,
a communication unit for transmitting a control signal to a power tool,
wherein the flow measuring unit comprises a rotation speed indicator unit to provide a rotation speed signal indicative of the rotation speed of the fan, and one or more pressure sensors to measure a pressure difference over the fan, wherein a control system of the device is arranged to measure the air flow rate by calculating the air flow rate from the pressure difference and from the rotation speed of the fan,
wherein the control system of the device is arranged to transmit a stopping instruction and/or a reducing instruction via the communication unit in a situation where the measured air flow rate is smaller than an alarm limit value, wherein the stopping instruction is an instruction for causing the power tool to stop generating dust particles, and wherein the reducing instruction is an instruction for reducing power of the power tool.

14. An apparatus comprising:
a dust extractor device, and
a power tool,
wherein the dust extractor device comprises:
a fan for causing an air flow,
a motor to rotate the fan,
a dust separator to separate dust particles from the air flow,
a flow measuring unit for measuring air flow rate of the air flow,
a control unit configured to adjust electric power of the motor based on the measured air flow rate, and
a communication unit for transmitting a control signal to the power tool,
wherein the flow measuring unit comprises a rotation speed indicator unit to provide a rotation speed signal indicative of the rotation speed of the fan, and one or more pressure sensors to measure a pressure difference over the fan, wherein a control system of the device is arranged to measure the air flow rate by calculating the air flow rate from the pressure difference and from the rotation speed of the fan, wherein the control system of the device is arranged to transmit a stopping instruction and/or a reducing instruction via the communication unit in a situation where the measured air flow rate is smaller than an alarm limit value, wherein the stopping instruction is an instruction for causing the power tool to stop generating dust particles, and wherein the reducing instruction is an instruction for reducing power of the power tool.

\* \* \* \* \*